US012643563B2

(12) United States Patent (10) Patent No.: US 12,643,563 B2
Yano et al. (45) Date of Patent: Jun. 2, 2026

(54) IN-VEHICLE DEVICE, TRAFFIC INFORMATION CREATING DEVICE, NOTIFYING METHOD, TRAFFIC INFORMATION CREATING METHOD, NOTIFYING PROGRAM, AND TRAFFIC INFORMATION CREATING PROGRAM

(71) Applicant: Sumitomo Electric Industries, Ltd., Osaka (JP)

(72) Inventors: Junji Yano, Osaka (JP); Tsuyoshi Haga, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 244 days.

(21) Appl. No.: 18/684,202

(22) PCT Filed: Apr. 26, 2022

(86) PCT No.: PCT/JP2022/018961
§ 371 (c)(1),
(2) Date: Feb. 16, 2024

(87) PCT Pub. No.: WO2023/021789
PCT Pub. Date: Feb. 23, 2023

(65) Prior Publication Data
US 2024/0367671 A1 Nov. 7, 2024

(30) Foreign Application Priority Data

Aug. 19, 2021 (JP) ................................. 2021-133907

(51) Int. Cl.
*B60W 50/14* (2020.01)
*G08G 1/01* (2006.01)

(52) U.S. Cl.
CPC ........... *B60W 50/14* (2013.01); *G08G 1/0112* (2013.01); *G08G 1/0133* (2013.01); *B60W 2420/403* (2013.01); *B60W 2552/10* (2020.02)

(58) Field of Classification Search
CPC ............. B60W 50/14; B60W 2552/10; B60W 2420/403; G08G 1/0112; G08G 1/0133
(Continued)

(56) References Cited

U.S. PATENT DOCUMENTS 6,038,496 A * 3/2000 Dobler ................. G05D 1/0242
701/72
6,577,246 B1 * 6/2003 Handa ................... G05D 1/0261
340/901
(Continued)

FOREIGN PATENT DOCUMENTS

JP 2006113918 A 4/2006
JP 2006-331389 A 12/2006
(Continued)

*Primary Examiner* — Luis A Martinez Borrero
(74) *Attorney, Agent, or Firm* — XSENSUS LLP

(57) ABSTRACT

An in-vehicle device includes: a first determination unit that determines whether a vehicle has crossed a right-side boundary of a traveling lane; a second determination unit that determines whether the vehicle has crossed a left-side boundary of the traveling lane; an operation determination unit that determines whether a drive operation performed on the vehicle by a driver satisfies a predetermined condition; a deviation determination unit that determines that the vehicle does not deviate from the traveling lane; and a count unit that counts the number of times determination has been made that the vehicle has crossed-the right-side boundary of the traveling lane and that the vehicle does not deviate from the traveling lane, and the number of times determination has been made that the vehicle has crossed the left-side
(Continued)

boundary of the traveling lane and that the vehicle does not deviate from the traveling lane.

20 Claims, 14 Drawing Sheets

(58) Field of Classification Search
USPC ........................................................ 701/117
See application file for complete search history.

(56) References Cited

U.S. PATENT DOCUMENTS

| | | | | |
|---|---|---|---|---|
| 8,311,729 | B2 * | 11/2012 | Saito .................... | B62D 15/025 |
| | | | | 701/122 |
| 8,346,437 | B2 * | 1/2013 | Hayakawa ........... | B60W 30/12 |
| | | | | 342/51 |
| 10,002,433 | B2 * | 6/2018 | Kumano .............. | G06V 20/588 |
| 10,252,748 | B2 * | 4/2019 | Sakaguchi ........... | B62D 15/026 |
| 10,864,911 | B2 * | 12/2020 | Jurca ..................... | G06V 20/56 |
| 10,891,854 | B2 * | 1/2021 | Oyama ........... | G08G 1/096822 |
| 11,335,195 | B2 * | 5/2022 | Oyama ............... | G06Q 10/047 |
| 11,654,908 | B2 * | 5/2023 | Bhatnagar ........... | B60W 40/072 |
| | | | | 701/117 |
| 11,708,110 | B2 * | 7/2023 | Fujii .................... | G05D 1/0212 |
| | | | | 701/42 |
| 2004/0016870 | A1 * | 1/2004 | Pawlicki .............. | B62D 15/025 |
| | | | | 315/77 |
| 2006/0239509 | A1 * | 10/2006 | Saito .................... | G06V 10/753 |
| | | | | 701/1 |
| 2007/0233386 | A1 * | 10/2007 | Saito ...................... | G08G 1/165 |
| | | | | 701/117 |
| 2008/0275635 | A1 * | 11/2008 | Jung ............... | B60W 30/18163 |
| | | | | 701/532 |
| 2009/0058622 | A1 * | 3/2009 | Hsieh ...................... | G08G 1/167 |
| | | | | 340/435 |
| 2012/0050074 | A1 * | 3/2012 | Bechtel ................ | G06V 10/147 |
| | | | | 382/104 |
| 2014/0180543 | A1 * | 6/2014 | Ueda .................... | B62D 15/025 |
| | | | | 701/41 |
| 2016/0339959 | A1 * | 11/2016 | Lee ....................... | G06V 20/588 |
| 2018/0170380 | A1 * | 6/2018 | Fendt .................... | G08G 1/167 |
| 2018/0237007 | A1 * | 8/2018 | Adam .................. | B60W 50/14 |
| 2018/0257647 | A1 * | 9/2018 | Jurca .................... | G01S 13/931 |
| 2020/0057487 | A1 * | 2/2020 | Sicconi .................. | G06F 3/011 |
| 2020/0079368 | A1 * | 3/2020 | Yamada ................ | G08G 1/166 |
| 2020/0307593 | A1 * | 10/2020 | Hirosawa ............. | B60W 10/04 |
| 2022/0105930 | A1 * | 4/2022 | Kurakami ......... | B60W 50/0097 |
| 2022/0254170 | A1 * | 8/2022 | Kagimoto ............... | G08G 1/16 |
| 2022/0274601 | A1 * | 9/2022 | Jia ....................... | B60W 40/072 |
| 2022/0348227 | A1 * | 11/2022 | Foster .................. | B60Q 1/507 |
| 2023/0135893 | A1 * | 5/2023 | Fujita .................. | B62D 15/025 |
| | | | | 701/41 |

FOREIGN PATENT DOCUMENTS

| | | |
|---|---|---|
| JP | 2018081634 A | 5/2018 |
| JP | 2018-195301 A | 12/2018 |
| JP | 2020-035157 A | 3/2020 |
| JP | 2021-111331 A | 8/2021 |
| WO | 2013175594 A1 | 11/2013 |

* cited by examiner

1

IN-VEHICLE DEVICE, TRAFFIC INFORMATION CREATING DEVICE, NOTIFYING METHOD, TRAFFIC INFORMATION CREATING METHOD, NOTIFYING PROGRAM, AND TRAFFIC INFORMATION CREATING PROGRAM

CROSS-REFERENCE TO RELATED APPLICATIONS

This application is based on PCT filing PCT/JP2022/018961, filed Apr. 26, 2022, which claims priority from Japanese Patent Application No. 2021-133907, filed Aug. 19, 2021, the entire content of each is incorporated herein by reference.

TECHNICAL FIELD

The present disclosure relates to an in-vehicle device, a traffic information creating device, a notifying method, a traffic information creating method, a notifying program, and a traffic information creating program.

BACKGROUND ART

PATENT LITERATURE 1 (Japanese Laid-Open Patent Publication No. 2006-331389) discloses a road line recognition apparatus for accurately detecting a road line on which an own vehicle travels, as follows. That is, in the road line recognition apparatus, a main camera and a sub camera capture images of a scenery including a road in the vehicle advancing direction to output a couple of analog images. Based on a reference image T, which is a digital image based on the couple of analog images and on digital data of a comparison image, an image processor calculates a parallax dp for calculating a distance, in a real space, for each of pixel blocks of 4×4 pixels in the reference image T. A road line candidate point detection and conversion processing unit detects a pixel having the possibility of indicating a road line from the reference image T, i.e., detects a road line candidate point, based on a luminance $p1_{ij}$ of each pixel of the reference image T and on the parallax dp, calculated by the image processor, of each pixel of the reference image T, and performs Hough conversion on the detected road line candidate point. A road line straight line detection processing unit extracts a plurality of straight lines as candidates for road lines on the left and right sides of the own vehicle, from a Hough plane obtained through the Hough conversion. Then, the road line straight line detection processing unit detects left and right straight lines suitable as road lines, i.e., road line straight lines, from among the detected straight lines, based on the position, behavior, etc., of the own vehicle. A road line detection processing unit determines, with reference to the detected road line straight lines, whether or not each road line candidate point is a pixel indicating a right road line or a left road line, and records, as a road line position, a road line candidate point determined to be a pixel indicating a road line. The road line detection processing unit detects a road line while following a road line in the state of a straight line or a curved line by tracing the relevant road line positions toward the upper side of the reference image T with reference to the detected road line positions. PATENT LITERATURE 1 describes that, even if a high luminance portion such as reflected light is generated on a road surface owing to rainy weather or the like, or a mark other than the road line, e.g., a mark indicating a road line branching, exists in the center of the road, the above configuration can stably and accurately detect the road line while excluding such obstacles.

CITATION LIST

Patent Literature

PATENT LITERATURE 1: Japanese Laid-Open Patent Publication No. 2006-331389

SUMMARY OF THE INVENTION

An in-vehicle device according to the present disclosure is an in-vehicle device installed in a vehicle, and includes: a first determination unit configured to determine whether or not the vehicle has crossed or may possibly cross a right-side boundary of a traveling lane that is a lane on which the vehicle is traveling, based on a captured image that shows a road around the vehicle; a second determination unit configured to determine whether or not the vehicle has crossed or may possibly cross a left-side boundary of the traveling lane, based on the captured image that shows the road around the vehicle; an operation determination unit configured to determine whether or not a drive operation performed on the vehicle by a driver satisfies a predetermined condition, when the first determination unit or the second determination unit has determined that the vehicle has crossed or may possibly cross the boundary of the traveling lane; a deviation determination unit configured to determine that the vehicle does not deviate from the traveling lane, when the operation determination unit has determined that the drive operation satisfies the predetermined condition; a count unit configured to count the number of times the first determination unit has determined that the vehicle has crossed or may possibly cross the right-side boundary of the traveling lane and the deviation determination unit has determined that the vehicle does not deviate from the traveling lane, and the number of times the second determination unit has determined that the vehicle has crossed or may possibly cross the left-side boundary of the traveling lane and the deviation determination unit has determined that the vehicle does not deviate from the traveling lane; and a notification unit configured to notify a processing device outside the vehicle of a count value of the count unit.

A traffic information creating device according to the present disclosure includes: a count acquisition unit configured to acquire, from a target vehicle, a count value based on at least one of the number of times a determination unit, which is configured to determine whether or not the target vehicle deviates from a traveling lane that is a lane on which the target vehicle is traveling, has determined, based on a captured image showing a road around the target vehicle, that the target vehicle has crossed or may possibly cross a right-side boundary of the traveling lane, and has determined that the target vehicle does not deviate from the traveling lane because a drive operation performed on the target vehicle by a driver satisfies a predetermined condition, and the number of times the determination unit has determined, based on the captured image showing the road around the target vehicle, that the target vehicle has crossed or may possibly cross a left-side boundary of the traveling lane, and has determined that the target vehicle does not deviate from the traveling lane because the drive operation satisfies the predetermined condition; a lane acquisition unit configured to acquire lane information indicating a lane on which the target vehicle travels; and a creation unit configured to create traffic information including information about a lane on which the target vehicle has traveled, based on the count value acquired by the count acquisition unit and the lane information acquired by the lane acquisition unit.

A notification method according to the present disclosure is a method in an in-vehicle device installed in a vehicle, and includes: counting at least one of the number of times determination has been made, based on a captured image showing a road around the vehicle, that the vehicle has crossed or may possibly cross a right-side boundary of a traveling lane that is a lane on which the vehicle is traveling, and determination has been made that the vehicle does not deviate from the traveling lane because a drive operation performed on the vehicle by a driver satisfies a predetermined condition, and the number of times determination has been made, based on the captured image showing the road around the vehicle, that the vehicle has crossed or may possibly cross a left-side boundary of the traveling lane, and determination has been made that the vehicle does not deviate from the traveling lane because the drive operation satisfies the predetermined condition; and notifying a processing device outside the vehicle of the count value obtained in the counting.

A traffic information creating method according to the present disclosure is a method in a traffic information creating device, and includes: acquiring, from a target vehicle, a count value based on at least one of the number of times a determination unit, which is configured to determine whether or not the target vehicle deviates from a traveling lane that is a lane on which the target vehicle is traveling, has determined, based on a captured image showing a road around the target vehicle, that the target vehicle has crossed or may possibly cross a right-side boundary of the traveling lane, and has determined that the target vehicle does not deviate from the traveling lane because a drive operation performed on the target vehicle by a driver satisfies a predetermined condition, and the number of times the determination unit has determined, based on the captured image showing the road around the target vehicle, that the target vehicle has crossed or may possibly cross a left-side boundary of the traveling lane, and has determined that the target vehicle does not deviate from the traveling lane because the drive operation satisfies the predetermined condition; acquiring lane information indicating a lane on which the target vehicle travels; and creating traffic information including information of a lane on which the target vehicle has traveled, based on the acquired count value and the acquired lane information.

A notifying program according to the present disclosure is a program used in an in-vehicle device installed in a vehicle, and causes a computer to function as: a first determination unit configured to determine whether or not the vehicle has crossed or may possibly cross a right-side boundary of a traveling lane that is a lane on which the vehicle is traveling, based on a captured image that shows a road around the vehicle; a second determination unit configured to determine whether or not the vehicle has crossed or may possibly cross a left-side boundary of the traveling lane, based on the captured image that shows the road around the vehicle; an operation determination unit configured to determine whether or not a drive operation performed on the vehicle by a driver satisfies a predetermined condition, when the first determination unit or the second determination unit has determined that the vehicle has crossed or may possibly cross the boundary of the traveling lane; a deviation determination unit configured to determine that the vehicle does not deviate from the traveling lane, when the operation determination unit has determined that the drive operation satisfies the predetermined condition; a count unit configured to count the number of times the first determination unit has determined that the vehicle has crossed or may possibly cross the right-side boundary of the traveling lane and the deviation determination unit has determined that the vehicle does not deviate from the traveling lane, and the number of times the second determination unit has determined that the vehicle has crossed or may possibly cross the left-side boundary of the traveling Jane and the deviation determination unit has determined that the vehicle does not deviate from the traveling lane; and a notification unit configured to notify a processing device outside the vehicle of a count value of the count unit.

A traffic information creating program according to the present disclosure is a program used in a traffic information creating device, and causes a computer to function as: a count acquisition unit configured to acquire, from a target vehicle, a count value based on at least one of the number of times a determination unit, which is configured to determine whether or not the target vehicle deviates from a traveling lane that is a lane on which the target vehicle is traveling, has determined, based on a captured image showing a road around the target vehicle, that the target vehicle has crossed or may possibly cross a right-side boundary of the traveling lane, and has determined that the target vehicle does not deviate from the traveling lane because a drive operation performed on the target vehicle by a driver satisfies a predetermined condition, and the number of times the determination unit has determined, based on the captured image showing the road around the target vehicle, that the target vehicle has crossed or may possibly cross a left-side boundary of the traveling lane, and has determined that the target vehicle does not deviate from the traveling lane because the drive operation satisfies the predetermined condition; a lane acquisition unit configured to acquire lane information indicating a lane on which the target vehicle travels; and a creation unit configured to create traffic information including information about a lane on which the target vehicle has traveled, based on the count value acquired by the count acquisition unit and the lane information acquired by the lane acquisition unit.

One mode of the present disclosure can be realized not only as an in-vehicle device including such a characteristic processing unit but also as a semiconductor integrated circuit that realizes a part or the entirety of the in-vehicle device, or as a traffic system including the in-vehicle device. Moreover, one mode of the present disclosure can be realized not only as a traffic information creating device including such a characteristic processing unit but also as a semiconductor integrated circuit that realizes a part or the entirety of the traffic information creating device, or as a traffic system including the traffic information creating device.

DETAILED DESCRIPTION

Figure 1:
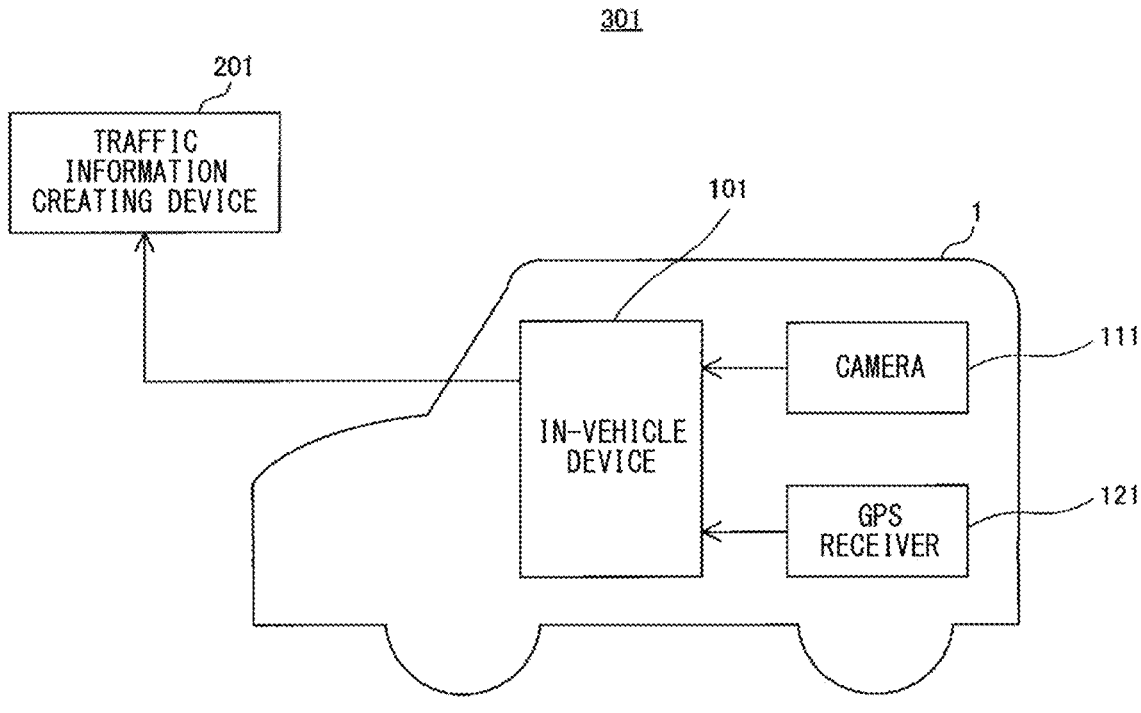
FIG. 1 shows an example of a configuration of a traffic system according to an embodiment of the present disclosure.

Conventionally, a technology of discriminating a lane on which a vehicle travels, and creating traffic information such as congestion information based on the discrimination result has been developed.

Problems to be Solved by the Present Disclosure

However, if the road line recognition apparatus as described above is installed in a vehicle to discriminate a lane on which the vehicle travels, the cost of the vehicle increases. Meanwhile, there has been an attempt to practically use a technology of discriminating a lane by using SLAM (Simultaneous Localization And Mapping). However, if SLAM is applied to a vehicle, the cost of the vehicle also increases. Furthermore, when SLAM is used, an error may occur in estimating the position of the own vehicle, and such an error may impede accurate discrimination of the lane on which the vehicle travels, and consequently impede creation of accurate traffic information. A technology capable of creating traffic information at low cost has been desired beyond the conventional technologies.

The present disclosure has been made in order to solve the above problem, and an object of the present disclosure is to provide an in-vehicle device, a traffic information creating device, a notifying method, a traffic information creating method, a notifying program, and a traffic information creating program which are capable of creating traffic information at low cost.

Effects of the Present Disclosure

According to the present disclosure, traffic information can be created at low cost.

Description of Embodiment of the Present Disclosure

First, contents of embodiments of the present disclosure are listed and described.

(1) An in-vehicle device according to an embodiment of the present disclosure is an in-vehicle device installed in a vehicle, and includes: a first determination unit configured to determine whether or not the vehicle has crossed or may possibly cross a right-side boundary of a traveling lane that is a lane on which the vehicle is traveling, based on a captured image that shows a road around the vehicle; a second determination unit configured to determine whether or not the vehicle has crossed or may possibly cross a left-side boundary of the traveling lane, based on the captured image that shows the road around the vehicle; an operation determination unit configured to determine whether or not a drive operation performed on the vehicle by a driver satisfies a predetermined condition, when the first determination unit or the second determination unit has determined that the vehicle has crossed or may possibly cross the boundary of the traveling lane; a deviation determination unit configured to determine that the vehicle does not deviate from the traveling lane, when the operation determination unit has determined that the drive operation satisfies the predetermined condition; a count unit configured to count the number of times the first determination unit has determined that the vehicle has crossed or may possibly cross the right-side boundary of the traveling lane and the deviation determination unit has determined that the vehicle does not deviate from the traveling lane, and the number of times the second determination unit has determined that the vehicle has crossed or may possibly cross the left-side boundary of the traveling lane and the deviation determination unit has determined that the vehicle does not deviate from the traveling lane; and a notification unit configured to notify a processing device outside a vehicle of a count value of the count unit.

In the above configuration, the number of times determination has been made that the vehicle does not deviate from the traveling lane because the drive operation performed on the vehicle by the driver satisfies the predetermined condition in the case where the vehicle has crossed or may possibly cross the right-side boundary of the traveling lane, and the number of times determination has been made that the vehicle does not deviate from the traveling lane because the drive operation performed on the vehicle by the driver satisfies the predetermined condition in the case where the vehicle has crossed or may possibly cross the left-side boundary of the traveling lane, are counted, and the count value is notified to the processing device. Therefore, for example, lane change according to the intention of the driver can be more accurately counted by using the existing technology for determining whether or not the vehicle deviates from the traveling lane, and the lane-change count value can be notified to the processing device that creates the traffic information. Thus, the processing device can create the traffic information in which the traveling lane of the vehicle is reflected. Therefore, the traffic information can be created at low cost.

(2) In the above (1), in order to determine whether or not the drive operation satisfies the predetermined condition, the operation determination unit may determine whether or not at least one of conditions as follows is satisfied: an abrupt steering wheel operation performed by the driver; an abrupt braking operation performed by the driver; an abrupt accelerating operation performed by the driver; and an operation of a direction indicator performed by the driver.

In the above configuration, deviation from the lane and lane change intended by the driver can be distinguished from each other.

(3) In the above (1) or (2), the notification unit may further notify the processing device of probe information indicating a detection result of a position of the vehicle and a detection time of the position.

In the above configuration, the processing device can create the traffic information about the road on which the vehicle has traveled, by using the probe information and the count value. Moreover, since the count value is notified to the processing device together with the probe information, notification to the processing device can be efficiently performed, compared to the configuration in which the count value and the probe information are separately notified to the processing device.

(4) In any one of the above (1) to (3), the in-vehicle device may further include a lane determination unit configured to, when detecting a junction, with another road, in a road on which the vehicle travels, determine a lane on which the vehicle travels, and the notification unit may further notify the processing device of a determination result by the lane determination unit.

In the above configuration, the lane on which the vehicle is traveling can be specified at the timing when counting is made by the count unit, taking into consideration the lane on which the vehicle travels at the junction with the other road.

(5) In any one of the above (1) to (3), the in-vehicle device may further include a lane determination unit configured to determine a lane on which the vehicle travels, and store a determination result in a storage unit. When detecting a change in the number of lanes at a junction, with another road, in a road on which the vehicle travels, the lane determination unit may delete a past determination result stored in the storage unit, may determine the lane on which the vehicle travels, and may store the determination result in the storage unit. The count unit may reset the count value when the lane determination unit has detected a change in the number of lanes. The notification unit may further notify the processing device of the determination result by the lane determination unit.

In the above configuration, in the case where the number of lanes has changed at the junction with the other road, the lane on which the vehicle is traveling can be specified at the timing when counting is made by the count unit, taking into consideration the lane on which the vehicle travels after the change in the number of lanes.

(6) In the above (4) or (5), the lane determination unit may determine the lane on which the vehicle travels, based on an image captured by an imaging unit installed in the vehicle.

In the above configuration, the degree of freedom regarding the timing and place for determining the lane on which the vehicle travels, can be increased.

(7) In any one of the above (4) to (6), the lane determination unit may determine the lane on which the vehicle travels, based on a current position of the vehicle and map information.

In the above configuration, for example, the lane on which the vehicle travels after merging into the main lane in the junction, can be easily determined and notified to the processing device.

(8) In the above (4), each time the vehicle enters an intersection, the lane determination unit may determine the lane on which the vehicle travels, based on the image.

In the above configuration, the lane on which the vehicle travels can be determined for each intersection, and notified to the processing device.

(9) A traffic information creating device according to the embodiment of the present disclosure includes: a count acquisition unit configured to acquire, from a target vehicle, a count value based on at least one of the number of times a determination unit, which is configured to determine whether or not the target vehicle deviates from a traveling lane that is a lane on which the target vehicle is traveling, has determined, based on a captured image showing a road around the target vehicle, that the target vehicle has crossed or may possibly cross a right-side boundary of the traveling lane, and has determined that the target vehicle does not deviate from the traveling lane because a drive operation performed on the target vehicle by a driver satisfies a predetermined condition, and the number of times the determination unit has determined, based on the captured image showing the road around the target vehicle, that the target vehicle has crossed or may possibly cross a left-side boundary of the traveling lane, and has determined that the target vehicle does not deviate from the traveling lane because the drive operation satisfies the predetermined condition; a lane acquisition unit configured to acquire lane information indicating a lane on which the target vehicle travels; and a creation unit configured to create traffic information including information about a lane on which the target vehicle has traveled, based on the count value acquired by the count acquisition unit and the lane information acquired by the lane acquisition unit.

In the above configuration, the traffic information is created based on the count value based on at least one of: the number of times determination has been made that the target vehicle does not deviate from the traveling lane because the drive operation performed on the target vehicle by the driver satisfies the predetermined condition in the case where the target vehicle has crossed or may possibly cross the right-side boundary of the traveling lane; and the number of times determination has been made that the target vehicle does not deviate from the traveling lane because the drive operation satisfies the predetermined condition in the case where the target vehicle has crossed or may possibly cross the left-side boundary of the traveling lane, and based on the lane on which the target vehicle travels. Therefore, the traffic information can be created by using, for example, a more accurate count value of lane change intended by the driver, whereby the traffic information in which the traveling lane of the vehicle is reflected can be created. Therefore, the traffic information can be created at low cost.

(10) In the above (9), the count acquisition unit may further acquire identification information of the target vehicle. The traffic information creating device may further include an image acquisition unit configured to acquire an image of a vehicle captured by a roadside device. The lane acquisition unit may create the lane information, based on the image acquired by the image acquisition unit and the identification information acquired by the count acquisition unit. The creation unit may create the traffic information, based on the count value and the lane information created by the lane acquisition unit.

In the above configuration, the traffic information can be created such that the lane on which the target vehicle travels is determined based on the image captured by the roadside device. Therefore, even when information indicating the lane on which the target vehicle travels cannot be acquired from the target vehicle, the traffic information can be created, taking into consideration the lane on which the target vehicle travels.

(11) A notification method according to the embodiment of the present disclosure is a method in an in-vehicle device installed in a vehicle, and includes: counting at least one of the number of times determination has been made, based on a captured image showing a road around the vehicle, that the vehicle has crossed or may possibly cross a right-side boundary of a traveling lane that is a lane on which the vehicle is traveling, and determination has been made that the vehicle does not deviate from the traveling lane because a drive operation performed on the vehicle by a driver satisfies a predetermined condition, and the number of times determination has been made, based on the captured image showing the road around the vehicle, that the vehicle has crossed or may possibly cross a left-side boundary of the traveling lane, and determination has been made that the vehicle does not deviate from the traveling lane because the drive operation satisfies the predetermined condition; and notifying a processing device outside the vehicle of the count value obtained in the counting.

In the above method, the number of times determination has been made that the vehicle does not deviate from the traveling lane because the drive operation performed on the vehicle by the driver satisfies the predetermined condition in the case where the vehicle has crossed or may possibly cross the right-side boundary of the traveling lane, and the number of times determination has been made that the vehicle does not deviate from the traveling lane because the drive operation satisfies the predetermined condition in the case where the vehicle has crossed or may possibly cross the left-side boundary of the traveling lane, are counted, and the count value is notified to the processing device. Therefore, for example, lane change according to the intention of the driver can be more accurately counted by using the existing technology for determining whether or not the vehicle deviates from the traveling lane, and the lane-change count value can be notified to the processing device that creates the traffic information. Thus, the processing device can create the traffic information in which the traveling lane of the vehicle is reflected. Therefore, the traffic information can be created at low cost.

(12) A traffic information creating method according to the embodiment of the present disclosure is a method in a traffic information creating device, and includes: acquiring, from a target vehicle, a count value based on at least one of the number of times a determination unit, which is configured to determine whether or not the target vehicle deviates from a traveling lane that is a lane on which the target vehicle is traveling, has determined, based on a captured image showing a road around the target vehicle, that the target vehicle has crossed or may possibly cross a right-side boundary of the traveling lane, and has determined that the target vehicle does not deviate from the traveling lane because a drive operation performed on the target vehicle by a driver satisfies a predetermined condition, and the number of times the determination unit has determined, based on the captured image showing the road around the target vehicle, that the target vehicle has crossed or may possibly cross a left-side boundary of the traveling lane, and has determined that the target vehicle does not deviate from the traveling lane because the drive operation satisfies the predetermined condition; acquiring lane information indicating a lane on which the target vehicle travels; and creating traffic information including information of a lane on which the target vehicle has traveled, based on the acquired count value and the acquired lane information.

In the above method, the traffic information is created based on the count value based on at least one of: the number of times determination has been made that the target vehicle does not deviate from the traveling lane because the drive operation performed on the target vehicle by the driver satisfies the predetermined condition in the case where the target vehicle has crossed or may possibly cross the right-side boundary of the traveling lane; and the number of times determination has been made that the target vehicle does not deviate from the traveling lane because the drive operation satisfies the predetermined condition in the case where the target vehicle has crossed or may possibly cross the left-side boundary of the traveling lane, and based on the lane on which the target vehicle travels. Therefore, the traffic information can be created by using, for example, a more accurate count value of lane change intended by the driver, whereby the traffic information in which the traveling lane of the vehicle is reflected can be created. Therefore, the traffic information can be created at low cost.

(13) A notifying program according to the embodiment of the present disclosure is a program used in an in-vehicle device installed in a vehicle, and causes a computer to function as: a first determination unit configured to determine whether or not the vehicle has crossed or may possibly cross a right-side boundary of a traveling lane that is a lane on which the vehicle is traveling, based on a captured image that shows a road around the vehicle; a second determination unit configured to determine whether or not the vehicle has crossed or may possibly cross a left-side boundary of the traveling lane, based on the captured image that shows the road around the vehicle; an operation determination unit configured to determine whether or not a drive operation performed on the vehicle by a driver satisfies a predetermined condition, when the first determination unit or the second determination unit has determined that the vehicle has crossed or may possibly cross the boundary of the traveling lane; a deviation determination unit configured to determine that the vehicle does not deviate from the traveling lane, when the operation determination unit has determined that the drive operation satisfies the predetermined condition; a count unit configured to count the number of times the first determination unit has determined that the vehicle has crossed or may possibly cross the right-side boundary of the traveling lane and the deviation determination unit has determined that the vehicle does not deviate from the traveling lane, and the number of times the second determination unit has determined that the vehicle has crossed or may possibly cross the left-side boundary of the traveling lane and the deviation determination unit has determined that the vehicle does not deviate from the traveling lane; and a notification unit configured to notify a processing device outside the vehicle of a count value of the count unit.

In the above configuration, the number of times determination has been made that the vehicle does not deviate from the traveling lane because the drive operation performed on the vehicle by the driver satisfies the predetermined condition in the case where the vehicle has crossed or may possibly cross the right-side boundary of the traveling lane, and the number of times determination has been made that the vehicle does not deviate from the traveling lane because the drive operation satisfies the predetermined condition in the case where the vehicle has crossed or may possibly cross the left-side boundary of the traveling lane, are counted, and the count value is notified to the processing device. Therefore, for example, lane change according to the intention of the driver can be more accurately counted by using the existing technology for determining whether or not the vehicle deviates from the traveling lane, and the lane-change count value can be notified to the processing device that creates the traffic information. Thus, the processing device can create the traffic information in which the traveling lane of the vehicle is reflected. Therefore, the traffic information can be created at low cost.

(14) A traffic information creating program according to the embodiment of the present disclosure is a program used in a traffic information creating device, and causes a computer to function as: a count acquisition unit configured to acquire, from a target vehicle, a count value based on at least one of the number of times a determination unit, which is configured to determine whether or not the target vehicle deviates from a traveling lane that is a lane on which the target vehicle is traveling, has determined, based on a captured image showing a road around the target vehicle, that the target vehicle has crossed or may possibly cross a right-side boundary of the traveling lane, and has determined that the target vehicle does not deviate from the traveling lane because a drive operation performed on the target vehicle by a driver satisfies a predetermined condition, and the number of times the determination unit has determined, based on the captured image showing the road around the target vehicle, that the target vehicle has crossed or may possibly cross a left-side boundary of the traveling lane, and has determined that the target vehicle does not deviate from the traveling lane because the drive operation satisfies the predetermined condition; a lane acquisition unit configured to acquire lane information indicating a lane on which the target vehicle travels; and a creation unit configured to create traffic information including information about a lane on which the target vehicle has traveled, based on the count value acquired by the count acquisition unit and the lane information acquired by the lane acquisition unit.

In the above configuration, the traffic information is created based on the count value based on at least one of: the number of times determination has been made that the target vehicle does not deviate from the traveling lane because the drive operation performed on the target vehicle by the driver satisfies the predetermined condition in the case where the vehicle has crossed or may possibly cross the right-side boundary of the traveling lane; and the number of times determination has been made that the target vehicle does not deviate from the traveling lane because the drive operation satisfies the predetermined condition in the case where the target vehicle has crossed or may possibly cross the left-side boundary of the traveling lane, and based on the traveling lane on which the target vehicle travels. Therefore, the traffic information can be created by using, for example, a more accurate count value of lane change intended by the driver, whereby the traffic information in which the traveling lane of the vehicle is reflected can be created. Therefore, the traffic information can be created at low cost.

Hereinafter, an embodiment of the present disclosure will be described with reference to the drawings. In the drawings, the same or corresponding parts are denoted by the same reference signs, and descriptions thereof are not repeated. At least some parts of the embodiments described below can be combined together as desired.

Configuration and Basic Operation

FIG. 1 shows an example of a configuration of a traffic system according to an embodiment of the present disclosure. With reference to FIG. 1, a traffic system 301 includes a traffic information creating device 201, an in-vehicle device 101, a camera 111, and a GPS (Global Positioning System) receiver 121. The in-vehicle device 101, the camera 111, and the GPS receiver 121 are installed in a vehicle 1.

The camera 111 photographs the surroundings of the vehicle 1 during traveling and stopping of the vehicle 1. The camera 111, for example, periodically transmits image information that indicates a photographed image showing a road around the vehicle 1 and a photographing time, to the in-vehicle device 101. The camera 111 is an example of an imaging unit. The photographed image is an example of a captured image.

The GPS receiver 121 receives a GPS signal from one or a plurality of satellites, and detects the position of the vehicle 1, based on the received GPS signal. The GPS receiver 121, for example, periodically creates position information that indicates a detection result of the position of the vehicle 1 and a detection time, based on the GPS signal, and transmits the created position information to the in-vehicle device 101.

The in-vehicle device 101 is, for example, a communication device used in telematics, and performs communication according to 5G, LTE (Long Term Evolution), or wireless LAN. The in-vehicle device 101 transmits probe information that indicates the detection result of the position of the vehicle 1 and the detection time, to the traffic information creating device 201.

The traffic information creating device 201 is an example of a processing device outside the vehicle 1. The traffic information creating device 201 is, for example, a cloud server. The traffic information creating device 201, for example, receives pieces of probe information from a plurality of in-vehicle devices 101 installed in different vehicles 1, and creates traffic information such as congestion information, based on the received pieces of probe information.

<In-Vehicle Device>

Figure 2:
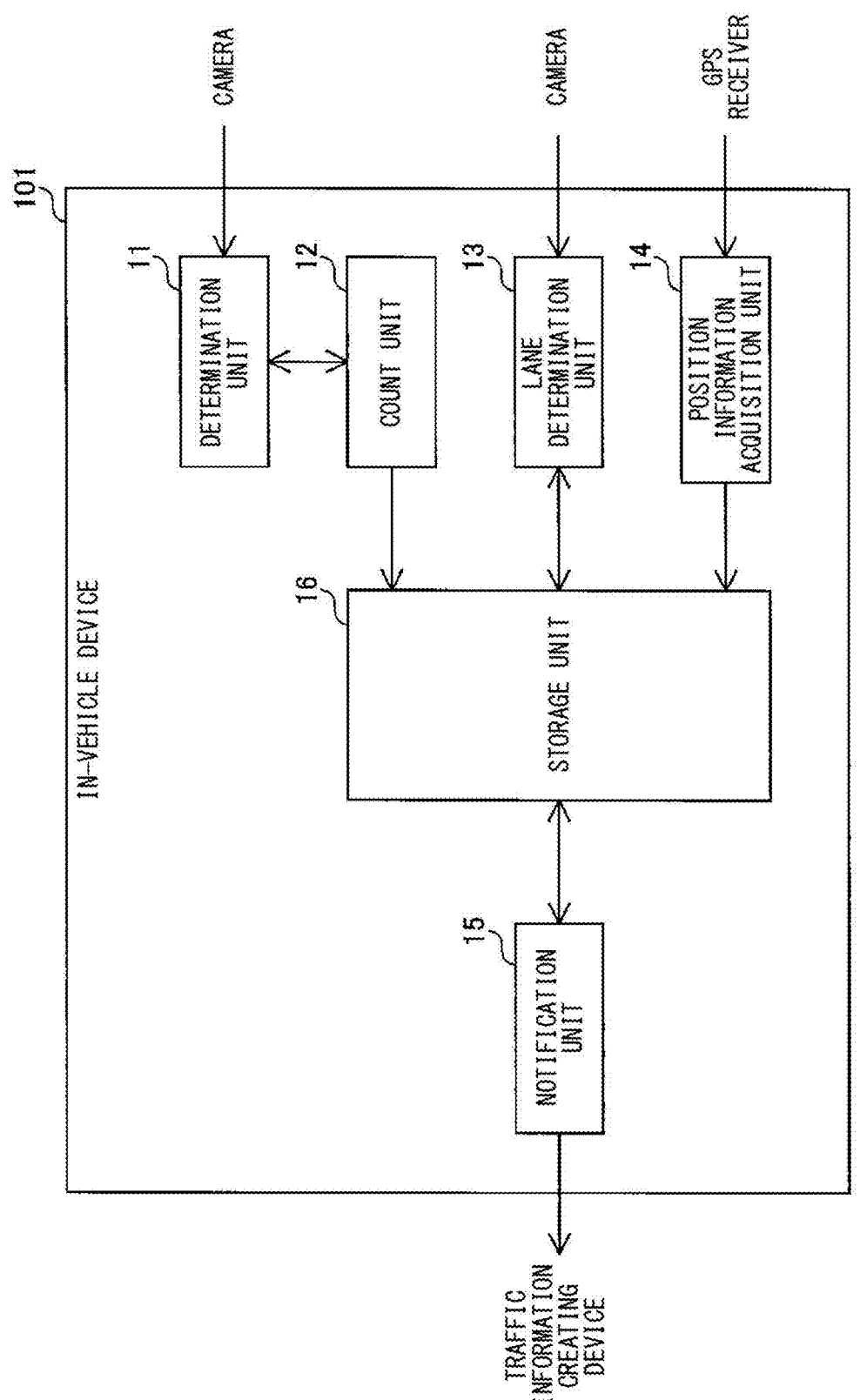
FIG. 2 shows an example of a configuration of an in-vehicle device according to the embodiment of the present disclosure.

FIG. 2 shows an example of a configuration of an in-vehicle device according to the embodiment of the present disclosure. With reference to FIG. 2, the in-vehicle device 101 includes a determination unit 11, a count unit 12, a lane determination unit 13, a position information acquisition unit 14, a notification unit 15, and a storage unit 16. The determination unit 11 is an example of a first determination unit, an example of a second determination unit, an example of an operation determination unit, and an example of a deviation determination unit. The determination unit 11, the count unit 12, the lane determination unit 13, the position information acquisition unit 14, and the notification unit 15 are implemented by, for example, a processor such as a CPU (Central Processing Unit) or a DSP (Digital Signal Processor).

The storage unit 16 is, for example, a non-volatile memory. The storage unit 16 has, stored therein, a vehicle ID as identification information of the vehicle 1, and map information.

The position information acquisition unit 14 receives the position information from the GPS receiver 121, and stores the received position information in the storage unit 16.
(Determination Process)

The determination unit 11 determines whether or not the vehicle 1 deviates from a lane. For example, the determination unit 11 receives the image information from the camera 111, and analyzes the photographed image indicated by the received image information, thereby performing a determination process of determining deviation of the vehicle 1 from a lane on which the vehicle 1 is traveling (hereinafter, also referred to as "traveling lane DL"). The determination unit 11 performs, for the driver of the vehicle 1, an alarm notification by voice or display according to the result of the determination process.

More specifically, when the determination unit 11 has determined that the vehicle 1 has deviated or may possibly deviate from the lane, based on a positional relationship between the vehicle 1 and a boundary of the traveling lane DL, the determination unit 11 performs the alarm notification. The determination unit 11 may be configured to perform different types of alarm notifications between the case where determination has been made that the vehicle 1 has deviated from the lane and the case where determination has been made that the vehicle 1 may possibly deviate from the lane.

The phrase "the vehicle 1 deviates from the lane" means that the vehicle 1 crosses the boundary of the traveling lane DL regardless of the intention of the driver of the vehicle 1. In addition, the vehicle 1 crossing the boundary of the traveling lane DL means that at least a part of the vehicle 1 runs on a demarcation line BL that demarcates the traveling lane DL in a plan view.

That is, when the vehicle 1 has crossed the boundary of the traveling lane DL according to the intention of the driver, the determination unit 11 does not determine that the vehicle 1 deviates from the lane. Specifically, when the vehicle 1 has crossed the boundary of the traveling lane DL due to a driving operation performed by the driver for a lane change, the determination unit 11 does not determine that the vehicle 1 deviates from the lane, and does not perform an alarm notification.

More specifically, the determination unit 11 determines whether or not the vehicle 1 has crossed or may possibly cross a right-side boundary of the traveling lane DL, based on the photographed image indicated by the image information received from the camera 111. In addition, the determination unit 11 determines whether or not the vehicle 1 has crossed or may possibly cross a left-side boundary of the traveling lane DL, based on the photographed image indicated by the image information received from the camera 111. That is, the determination unit 11 determines whether or not the positional relationship between the vehicle 1 and the traveling lane DL satisfies a determination condition C1R as to whether or not the vehicle 1 has crossed or may possibly cross the right-side boundary of the traveling lane DL, and whether or not a determination condition C1L as to whether or not the vehicle 1 has crossed or may possibly cross the left-side boundary of the traveling lane DL.

When determining that the positional relationship between the vehicle 1 and the traveling lane DL satisfies the determination condition C1R or the determination condition C1L, the determination unit 11 determines whether or not the drive operation performed on the vehicle 1 by the driver satisfies a predetermined operation condition C2. For example, in order to determine whether or not the drive operation satisfies the operation condition C2, the determination unit 11 determines whether or not at least one of conditions as follows is satisfied: an abrupt steering wheel operation performed by the driver; an abrupt braking operation performed by the driver; an abrupt accelerating operation performed by the driver; and an operation of a direction indicator performed by the driver. The abrupt steering wheel operation means a steering wheel operation in which the angle of rotation of the steering wheel per unit time is greater than or equal to a predetermined value. The abrupt braking operation means a braking operation in which the amount of decrease in acceleration is greater than or equal to a predetermined value. The abrupt accelerating operation is an accelerating operation in which the amount of increase in acceleration is greater than or equal to a predetermined value.

When determining that the drive operation satisfies the operation condition C2, the determination unit 11 determines that the vehicle 1 does not deviate from the traveling lane DL, and does not perform an alarm notification. Meanwhile, when determining that the drive operation does not satisfy the operation condition C2, the determination unit 11 determines that the vehicle 1 deviates from the traveling lane DL, and performs an alarm notification.

When determining that the drive operation satisfies the operation condition C2, the determination unit 11 notifies the count unit 12 of a determination result R1 indicating that the vehicle 1 does not deviate from the lane, and a determination time Rt. Meanwhile, when determining that the drive operation does not satisfy the operation condition C2, the determination unit 11 does not notify the count unit 12 of the determination result R1 and the determination time Rt.

For example, when the positional relationship between the vehicle 1 and the traveling lane DL satisfies the determination condition C1R and the drive operation satisfies the operation condition C2, the determination unit 11 notifies the count unit 12 of a determination result R1R indicating that the vehicle 1 does not deviate from the lane, as the determination result R1. Furthermore, for example, when the positional relationship between the vehicle 1 and the traveling lane DL satisfies the determination condition C1L and the drive operation satisfies the operation condition C2, the determination unit 11 notifies the count unit 12 of a determination result R1L indicating that the vehicle 1 does not deviate from the lane, as the determination result R1.
(Count of Determination Result)

The count unit 12 counts the number of times the determination unit 11 has determined that the vehicle 1 has crossed or may possibly cross the right-side boundary of the traveling lane DL and has determined that the vehicle 1 does not deviate from the traveling lane DL, and counts the number of times the determination unit 11 has determined that the vehicle 1 has crossed or may possibly cross the left-side boundary of the traveling lane DL and has determined that the vehicle 1 does not deviate from the traveling lane DL. Specifically, the count unit 12 counts the occurrence of the determination result by the determination unit 11, i.e., the determination result R1 indicating that the vehicle 1 does not deviate from the traveling lane DL because the positional relationship between the vehicle 1 and the traveling lane DL satisfies the determination condition C1 and the drive operation satisfies the operation condition C2.

More specifically, upon receiving the determination result R1 from the determination unit 11, the count unit 12 registers, in a ring buffer in the storage unit 16, a count value Cnt obtained by counting the occurrence of the determination result R1.

As described above, the determination unit 11 may notify the count unit 12 of the determination result R1R or may notify the count unit 12 of the determination result R1L, as the determination result R1. The count unit 12 can discriminate the determination result R1 received from the determination unit 11, between the determination result R1R and the determination result R1L. For example, the count unit 12 increments the count value Cnt, upon being notified of the determination result R1R from the determination unit 11, and decrements the count value Cnt, upon being notified of the determination result R1L from the determination unit 11.

Figure 3:
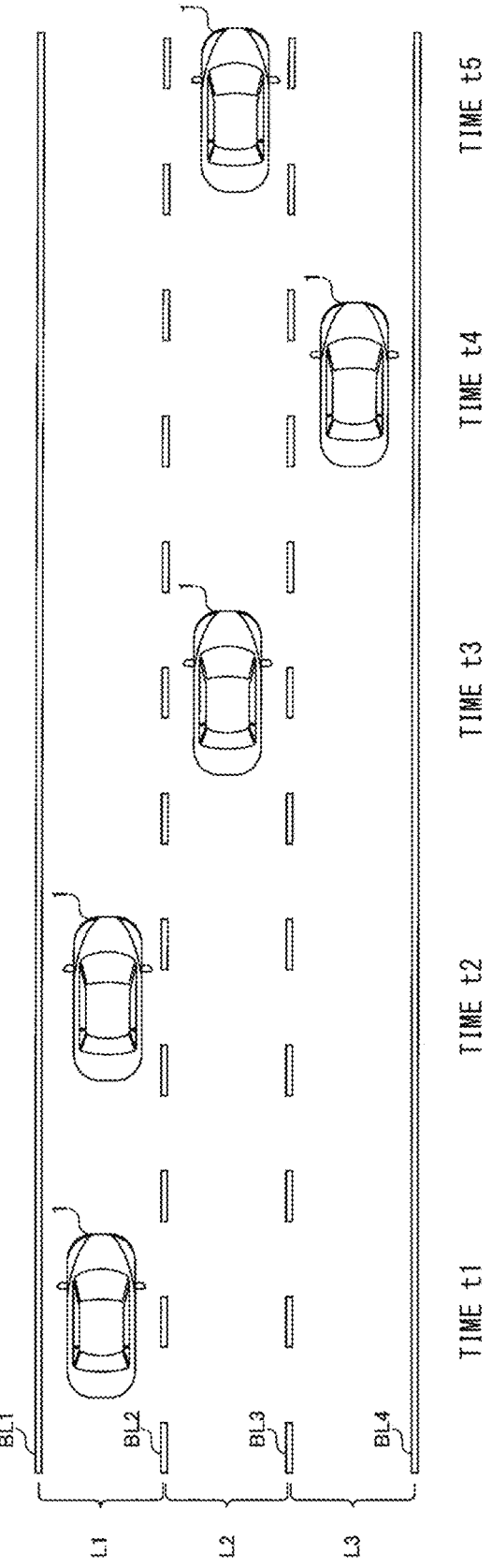
FIG. 3 shows an example of counting a determination result by a count unit in the in-vehicle device according to the embodiment of the present disclosure.

FIG. 3 shows an example of counting the determination result by the count unit in the in-vehicle device according to the embodiment of the present disclosure. FIG. 3 shows a state in which the vehicle 1 is traveling on a road having three lanes on each side, consisting of a lane L1, a lane L2, and a lane L3 from the left side in the advancing direction. The lane L1 is demarcated by a roadway outer line BL1 and a lane boundary line BL2. The lane L2 is demarcated by the lane boundary line BL2 and a lane boundary line BL3. The lane L3 is demarcated by the lane boundary line BL3 and a roadway center line BL4. The roadway outer line BL1, the lane boundary lines BL2, BL3, and the roadway center line BL4 are examples of the demarcation line BL.

With reference to FIG. 3, the vehicle 1 is traveling on the lane L1 at time t1. It is assumed that the latest count value Cnt registered in the storage unit 16 at time t1 is zero.

At time t2, if the vehicle 1 is properly traveling on the traveling lane DL and the positional relationship between the vehicle 1 and the traveling lane DL does not satisfy the determination condition C1, the determination unit 11 determines that the vehicle 1 does not deviate from the lane.

At time t3, if the vehicle 1 crosses the lane boundary line BL2 because the driver has performed a drive operation for a lane change from the lane L1 to the lane L2, the determination unit 11 determines that the vehicle 1 does not deviate from the lane because the positional relationship between the vehicle 1 and the traveling lane DL satisfies the determination condition C1R and the drive operation satisfies the operation condition C2, and notifies the count unit 12 of the determination result R1R and time t3 as the determination time Rt.

Upon being notified of the determination result R1R and the determination time Rt from the determination unit 11, the count unit 12 registers a new count value Cnt, which is obtained by incrementing the latest count value Cnt in the storage unit 16, in association with the determination time Rt.

At time t4, if the vehicle 1 crosses the lane boundary line BL3 because the driver has performed a drive operation for a lane change from the lane L2 to the lane L3, the determination unit 11 determines that the vehicle 1 does not deviate from the lane because the positional relationship between the vehicle 1 and the traveling lane DL satisfies the determination condition C1R and the drive operation satisfies the operation condition C2, and notifies the count unit 12 of the determination result R1R and time t4 as the determination time Rt.

Upon being notified of the determination result R1R and the determination time Rt from the determination unit 11, the count unit 12 registers a new count value Cnt, which is obtained by incrementing the latest count value Cnt in the storage unit 16, in association with the determination time Rt.

At time t5, if the vehicle 1 crosses the lane boundary line BL3 because the driver has performed a drive operation for a lane change from the lane L3 to the lane L2, the determination unit 11 determines that the vehicle 1 does not deviate from the lane because the positional relationship between the vehicle 1 and the traveling lane DL satisfies the determination condition C1L and the drive operation satisfies the operation condition C2, and notifies the count unit 12 of the determination result R1L and time t5 as the determination time Rt.

Upon being notified of the determination result R1L from the determination unit 11, the count unit 12 registers a new count value Cnt, which is obtained by decrementing the latest count value Cnt in the storage unit 16, in association with the determination time Rt.

(Lane Determination Process)

The lane determination unit 13 performs a lane determination process of determining a traveling lane DL when detecting a junction, with another road, in the road on which the vehicle 1 travels. For example, when detecting a junction, the lane determination unit 13 further determines the number of lanes (hereinafter, also referred to as number-of-lanes LN) of the road on which the vehicle 1 travels.

Figure 4:
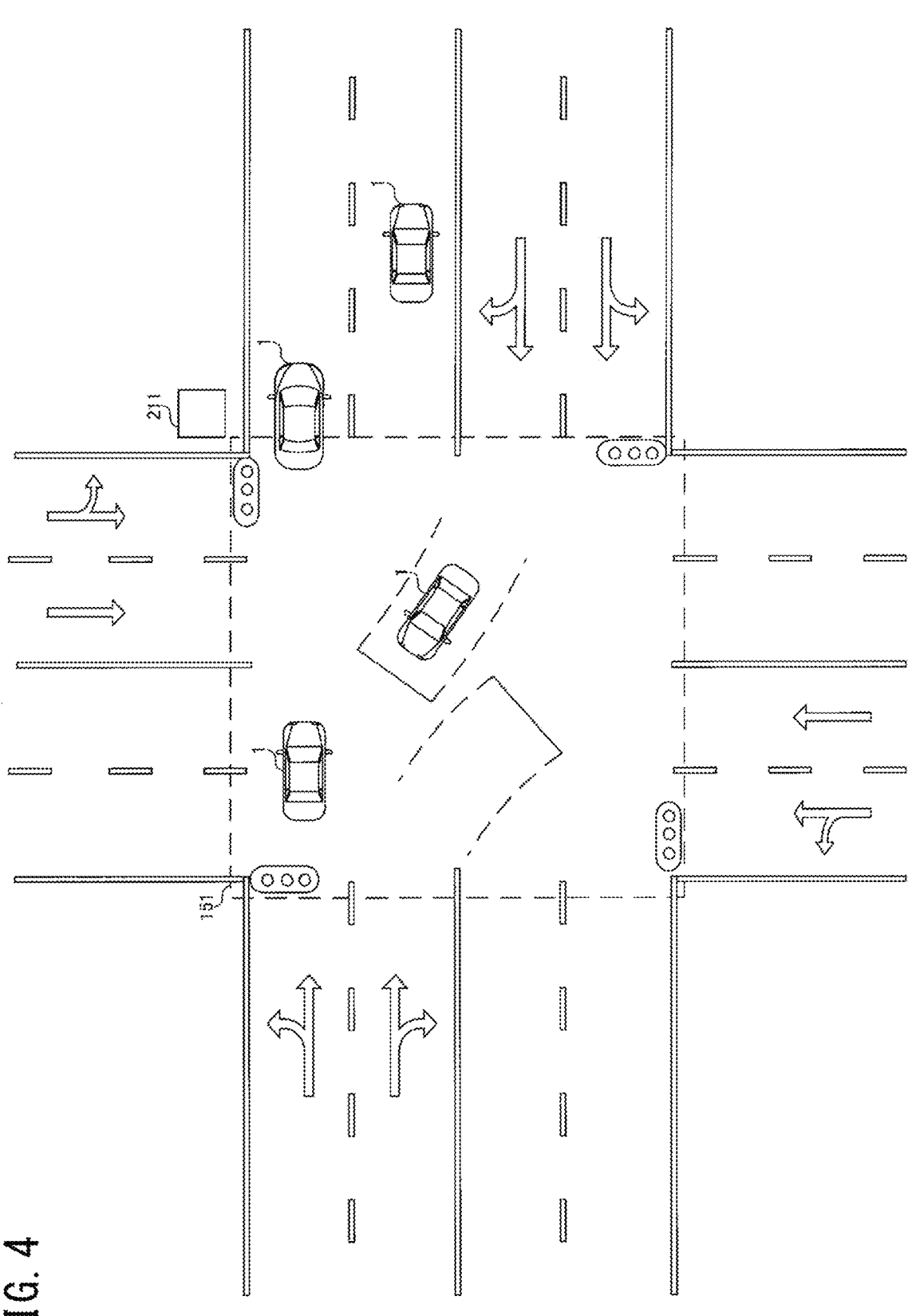
FIG. 4 shows an example of a lane determination process by the in-vehicle device according to the embodiment of the present disclosure.

FIG. 4 shows an example of the lane determination process by the in-vehicle device according to the embodiment of the present disclosure. With reference to FIG. 4, the lane determination unit 13 detects an intersection 151 as a junction, with another road, in the road on which the vehicle 1 travels. More specifically, the lane determination unit 13 performs the lane determination process, when determining that the vehicle 1 has entered the intersection 151, based on the map information and the position information stored in the storage unit 16.

For example, the lane determination unit 13 determines the traveling lane DL and the number-of-lanes LN, based on an image photographed by the camera 111. As one example, each time the vehicle 1 enters the intersection 151, the lane determination unit 13 determines the traveling lane DL and the number-of-lanes LN, based on the photographed image.

Figure 5:
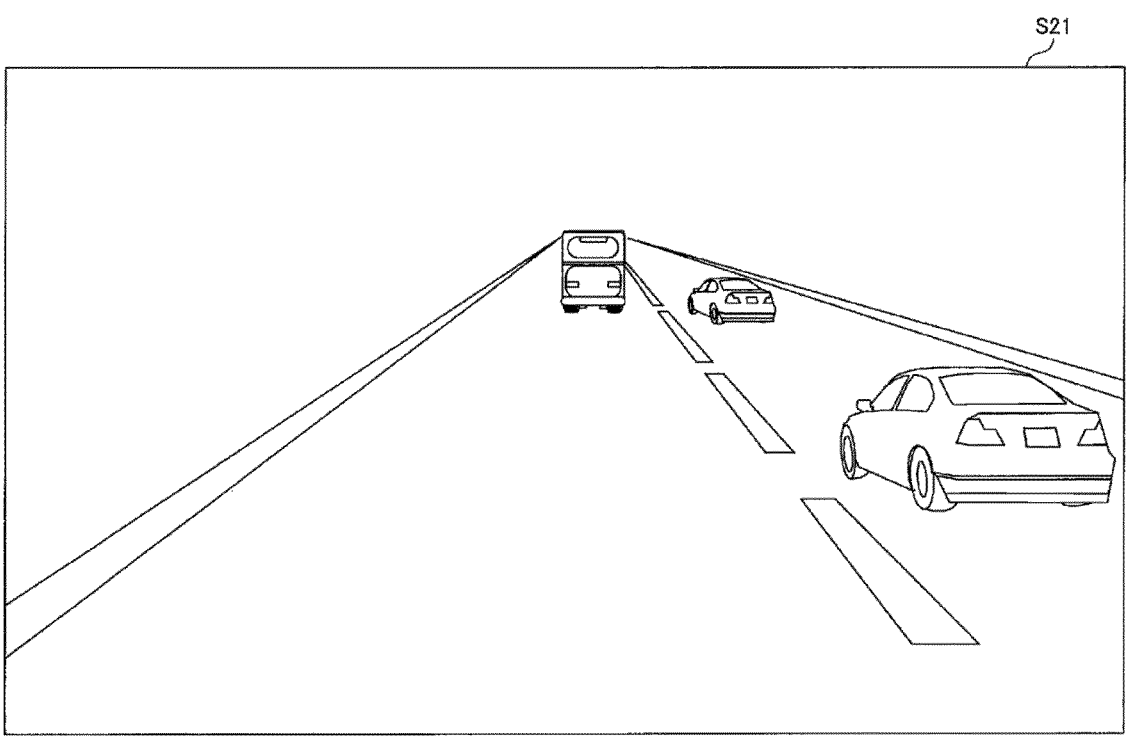
FIG. 5 shows an example of an image photographed by a camera in the traffic system according to the embodiment of the present disclosure.
Figure 6:
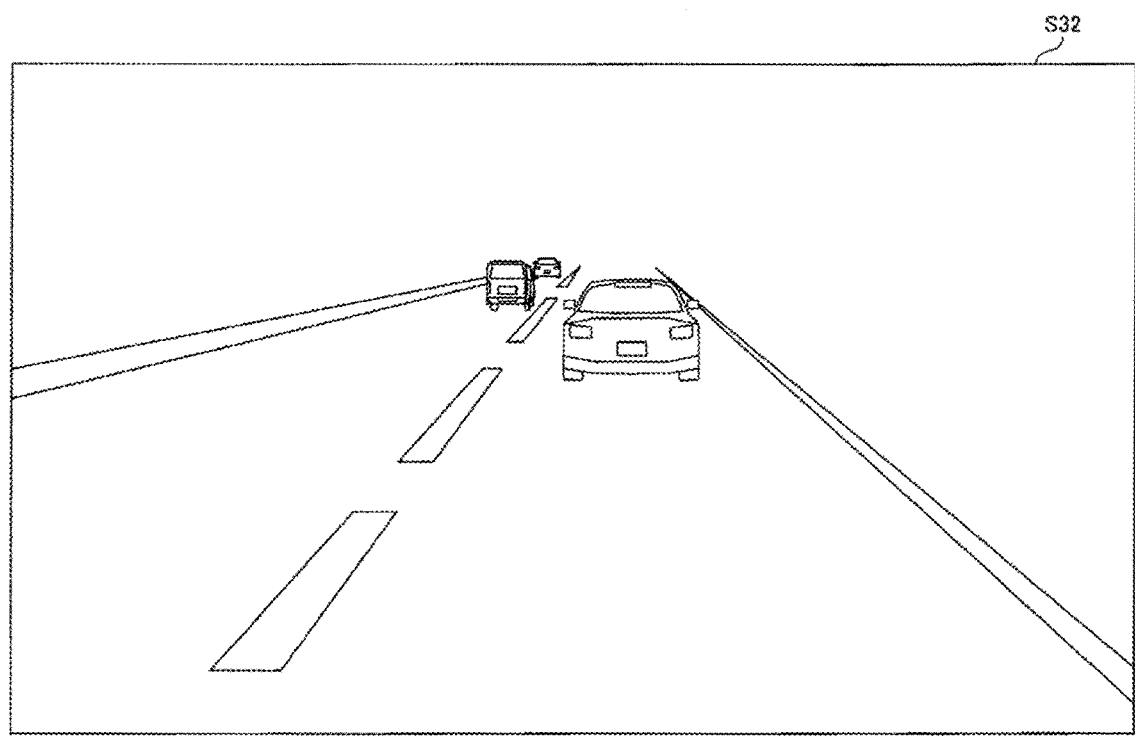
FIG. 6 shows an example of an image photographed by the camera in the traffic system according to the embodiment of the present disclosure.

FIG. 5 and FIG. 6 each show an example of an image photographed by the camera in the traffic system according to the embodiment of the present disclosure. FIG. 5 shows a photographed image S21 obtained by the camera 111 photographing an area ahead of the vehicle 1 while the vehicle 1 is traveling on a leftmost lane of a road having two lanes on each side. FIG. 6 shows a photographed image S32 obtained by the camera 111 photographing an area ahead of the vehicle 1 while the vehicle 1 is traveling on a rightmost lane of the road having two lanes on each side.

With reference to FIG. 5 and FIG. 6, the lane determination unit 13 analyzes the photographed images S21, S32 to determine the traveling lane DL and the number-of-lanes LN, based on, for example, the pattern of the demarcation lines BL in the photographed images S21, S32.

The lane determination unit 13 is configured to detect an intersection as a junction, with another road, in the road on which the vehicle 1 travels, but is not limited thereto. The lane determination unit 13 may be configured to detect a junction other than an intersection.

Figure 7:
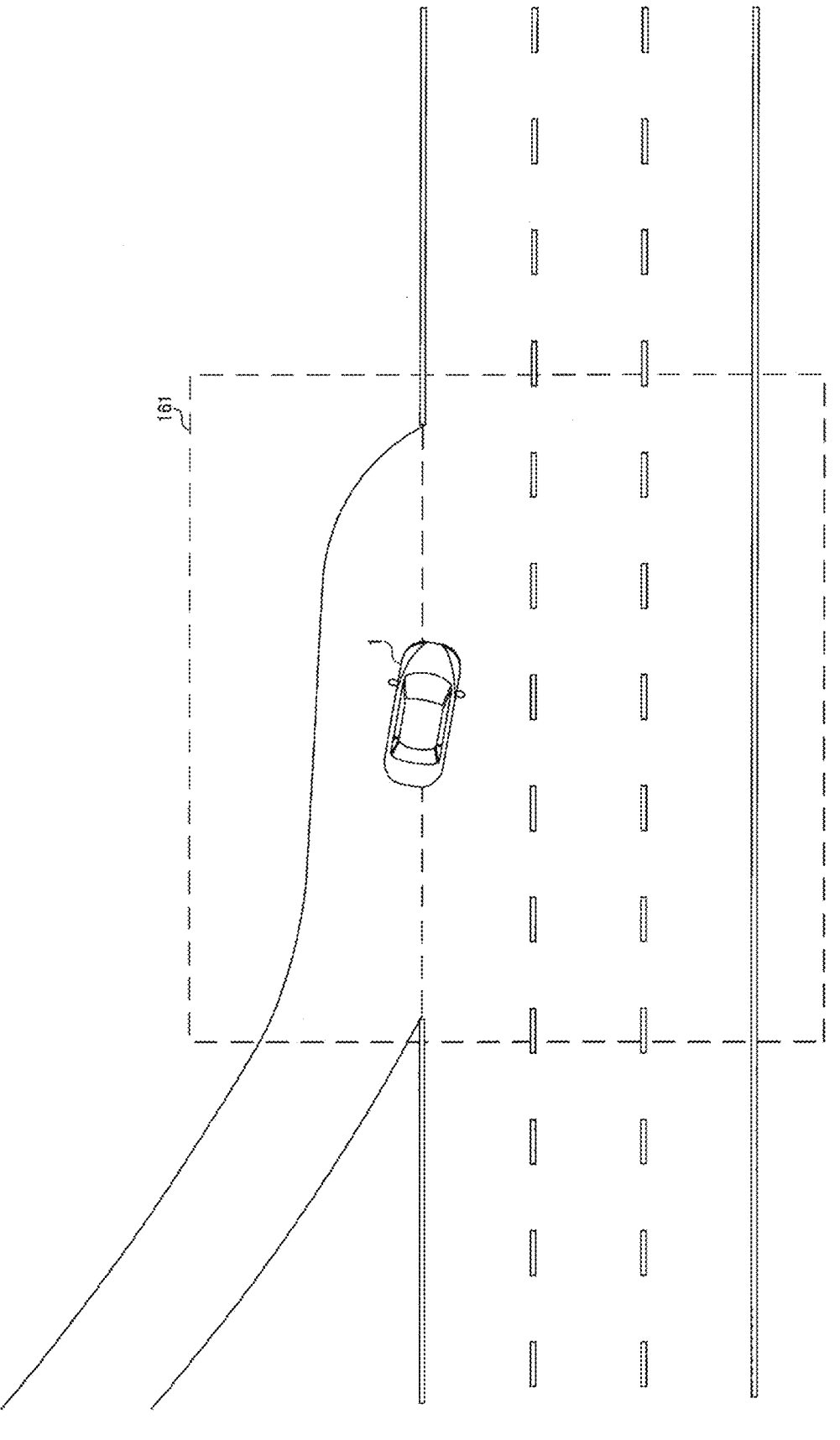
FIG. 7 shows another example of a lane determination process by the in-vehicle device according to the embodiment of the present disclosure.

FIG. 7 shows another example of the lane determination process by the in-vehicle device according to the embodiment of the present disclosure. With reference to FIG. 7, the lane determination unit 13 determines the traveling lane DL and the number-of-lanes LN, based on the current position of the vehicle 1 and the map information. More specifically, the lane determination unit 13 detects, for example, a junction 161 of a highway, as the junction, with another road, in the road on which the vehicle 1 travels, based on the map information and the position information stored in the storage unit 16.

The lane determination unit 13 performs the lane determination process, when determining that the vehicle 1 has entered the junction 161, based on the map information and the position information.

More specifically, the map information stored in the storage unit 16 includes: information indicating whether the junction 161 of the highway is a junction 161 that merges into a main lane from the right side or a junction 161 that merges into the main lane from the left side; and information indicating the number of lanes of the highway.

The lane determination unit 13 determines that the vehicle 1 is traveling on the leftmost lane, when determining that the vehicle 1 has entered the junction 161 that merges into the main lane from the left side, based on the map information and the position information stored in the storage unit 16. Meanwhile, the lane determination unit 13 determines that the vehicle 1 is traveling on the rightmost lane when determining that the vehicle 1 has entered the junction 161 that merges into the main lane from the right side, based on the map information and the position information stored in the storage unit 16.

For example, the lane determination unit 13 performs the lane determination process based on the photographed image when the vehicle 1 is traveling on a normal road, and performs the lane determination process based on the map information and the position information when the vehicle 1 is traveling on the highway. The lane determination unit 13 may be configured not to perform one of the lane determination process based on the photographed image and the lane determination process based on the map information and the position information. In addition, when the lane determination unit 13 has detected a junction 161 in the normal road, based on the map information and the position information stored in the storage unit 16, while the vehicle 1 is traveling on the normal road, the lane determination unit 13 may determine the traveling lane DL and the number-of-lanes LN, based on the type of the junction 161 indicated by the map information. Moreover, when the lane determination unit 13 has detected a junction with another road, such as the junction 161, based on the map information and the position information stored in the storage unit 16, while the vehicle 1 is traveling on the highway, the lane determination unit 13 may determine the traveling lane DL and the number-of-lanes LN, based on the image photographed by the camera 111.

After determining the traveling lane DL and the number-of-lanes LN through the lane determination process, the lane determination unit 13 stores, in the storage unit 16, lane information indicating: a lane determination time Jt at which the lane determination process was performed; the traveling lane DL; and the number-of-lanes LN. For example, after the lane determination process, the lane determination unit 13 deletes the past determination result of the traveling lane DL stored in the storage unit 16. That is, the lane determination unit 13 resets the past traveling lane DL indicated by the lane information stored in the storage unit 16.

The lane determination unit 13 is configured to perform the lane determination process when detecting a junction, with another road, in the road on which the vehicle 1 travels, but is not limited thereto. When the lane determination unit 13 has detected a junction, and a change (i.e., an increase or a decrease) in the number-of-lanes LN in the junction, the lane determination unit 13 may perform the lane determination process and store the lane information in the storage unit 16. Also, in this case, after the lane determination process, the lane determination unit 13 resets the past traveling lane DL indicated by the lane information stored in the storage unit 16.

For example, when the lane determination unit 13 has detected a change in the number-of-lanes LN, the count unit 12 resets the count value Cnt. More specifically, the count unit 12 resets the count value Cnt in the storage unit 16 to zero when the lane determination unit 13 has performed the lane determination process according to the change in the number-of-lanes LN and stored the lane information in the storage unit 16.

(Transmission of Probe Information)

The notification unit 15 acquires the vehicle ID and the latest position information from the storage unit 16 at, for example, a transmission timing that follows a predetermined transmission cycle Cy, creates probe information including the acquired vehicle ID and position information, and transmits the created probe information to the traffic information creating device 201.

The notification unit 15 notifies the traffic information creating device 201 of the count value Cnt of the count unit 12. For example, the notification unit 15 notifies the traffic information creating device 201 of the count value Cnt, at a timing corresponding to a notification timing of the probe information to the traffic information creating device 201. As one example, the notification unit 15 notifies the traffic information creating device 201 of the count value Cnt together with the probe information.

More specifically, at the transmission timing that follows the transmission cycle Cy, the notification unit 15 refers to the storage unit 16, and if a count value Cnt that has not been notified to the traffic information creating device 201 is stored in the storage unit 16, acquires this count value Cnt and the corresponding determination time Rt. Then, the notification unit 15 creates probe information further including relative position information indicating the acquired count value Cnt and determination time Rt, and transmits the created probe information to the traffic information creating device 201.

For example, the notification unit 15 further notifies the traffic information creating device 201 of the determination result by the lane determination unit 13. More specifically, at the transmission timing that follows the transmission cycle Cy, the notification unit 15 refers to the storage unit 16, and if lane information that has not been notified to the traffic information creating device 201 is stored in the storage unit 16, acquires this lane information. Then, the notification unit 15 creates probe information further including the acquired lane information, and transmits the created probe information to the traffic information creating device 201.

<Traffic Information Creating Device>

Figure 8:
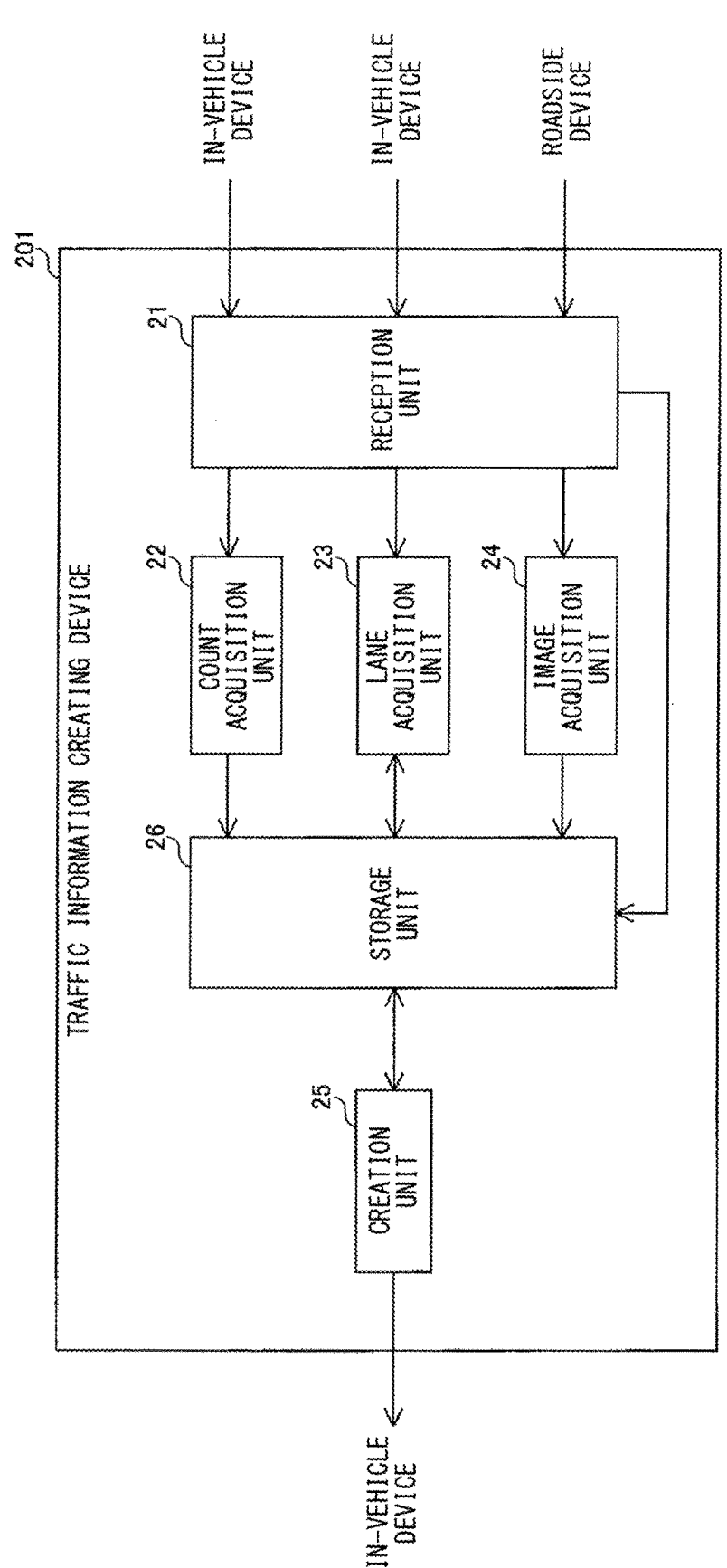
FIG. 8 shows an example of a configuration of a traffic information creating device according to the embodiment of the present disclosure.

FIG. 8 shows an example of a traffic information creating device according to the embodiment of the present disclosure. With reference to FIG. 8, the traffic information creating device 201 includes a reception unit 21, a count acquisition unit 22, a lane acquisition unit 23, an image acquisition unit 24, a creation unit 25, and a storage unit 26. The reception unit 21, the count acquisition unit 22, the lane acquisition unit 23, the image acquisition unit 24, and the creation unit 25 are implemented by, for example, a processor such as a CPU or a DSP.

The storage unit 26 is, for example, a non-volatile memory. The storage unit 26 has, stored therein, a correspondence table indicating a correspondence relationship between vehicle IDs and serial designated numbers on license plates of vehicles 1.

The reception unit 21 receives probe information from an in-vehicle device 101 of a vehicle 1. The reception unit 21 acquires a vehicle ID and position information from the received probe information, and stores, in the storage unit 26, the acquired position information in association with the vehicle ID.

The count acquisition unit 22 acquires a count value Cnt based on at least one of: the number of times a determination unit 11 of a target vehicle 1K being a certain vehicle 1 has determined that the target vehicle 1K has crossed or may possibly cross a right-side boundary of a lane, and has determined that the target vehicle 1K does not deviate from the lane because a drive operation performed on the target vehicle 1K by the driver satisfies the operation condition C2; and the number of times the determination unit 11 has determined that the target vehicle 1K has crossed or may possibly cross a left-side boundary of the lane, and has determined that the target vehicle 1K does not deviate from the lane because the drive operation satisfies the operation condition C2. For example, the count acquisition unit 22 acquires the count value Cnt and the vehicle ID from the target vehicle 1K. More specifically, the reception unit 21 acquires the vehicle ID and the relative position information from the probe information, and outputs the acquired vehicle ID and relative position information to the count acquisition unit 22. The count acquisition unit 22 associates the relative position information received from the reception unit 21 with the vehicle ID, and stores them in the storage unit 26. If the target vehicle 1K has not performed a lane change to the left-side lane while performing a lane change to the right-side lane in a certain transmission cycle Cy, the count acquisition unit 22 acquires, from the target vehicle 1K, the count value Cnt based on only the determination result R1R. Meanwhile, if the target vehicle 1K has not performed a lane change to the right-side lane while performing a lane change to the left-side lane in a certain transmission cycle Cy, the count acquisition unit 22 acquires, from the target vehicle 1K, the count value Cnt based on only the determination result R1L.

The lane acquisition unit 23 acquires the lane information indicating the lane on which the target vehicle 1K travels. More specifically, the reception unit 21 acquires the vehicle ID and the lane information from the probe information, and outputs the acquired vehicle ID and lane information to the lane acquisition unit 23. The lane acquisition unit 23 associates the lane information received from the reception unit 21 with the vehicle ID, and stores them in the storage unit 26.

The creation unit 25 creates traffic information including information about the lane on which the target vehicle 1K has traveled, based on the count value Cnt acquired by the count acquisition unit 22 and the lane information acquired by the lane acquisition unit 23.

More specifically, the creation unit 25 determines the traveling lane DL of the target vehicle 1K at one or a plurality of determination times Rt, based on the count value Cnt at the determination time Rt indicated by the relative position information of the target vehicle 1K, with reference to the traveling lane DL at the lane determination time Jt indicated by the lane information of the target vehicle 1K. Then, the creation unit 25 calculates the traffic volume of each lane during a predetermined time period, based on the determination result, and creates the traffic information, based on the calculation result.

For example, the creation unit 25 transmits the created traffic information to one or a plurality of vehicles 1.

(Another Example of Creation of Traffic Information)

Referring back to FIG. 4, a roadside device 211 installed on the road photographs the intersection 151 and its vicinity. The roadside device 211 is capable of communicating with the traffic information creating device 201 via a wireless base station, by using ITS (Intelligent Transport System), for example. The roadside device 211, for example, periodically transmits an infrastructure image information to the traffic information creating device 201. The infrastructure image information includes: a photographed image that is an image obtained by photographing the intersection 151 and its vicinity; a photographing time; and a roadside device ID that is identification information of the roadside device 211.

Referring back to FIG. 8, the image acquisition unit 24 acquires the photographed image of the vehicle 1 obtained by the roadside device 211. More specifically, the reception unit 21 receives the infrastructure image information from one or a plurality of roadside devices 211. The reception unit 21 acquires, from the received infrastructure image information, the photographed image, the photographing time, and the roadside device ID, and outputs them to the image acquisition unit 24. The image acquisition unit 24 associates the photographed image and the photographing time received from the reception unit 21 with the roadside device ID, and stores them in the storage unit 26.

The lane acquisition unit 23 creates lane information, based on the photographed image acquired by the image acquisition unit 24 and the vehicle ID acquired by the count acquisition unit 22.

More specifically, the storage unit 26 has, stored therein, pieces of installation information indicating the installation positions of a plurality of roadside devices 211.

With reference to the storage unit 26, the lane acquisition unit 23 specifies a roadside device 211 installed by the road on which the target vehicle 1K has traveled, based on the position information corresponding to the vehicle ID of the target vehicle 1K, and the installation information. For example, the lane acquisition unit 23 specifies the roadside device 211 installed by the road on which the target vehicle 1K has traveled, further based on the advancing direction of the target vehicle 1K, traveling speed of the target vehicle 1K, and the positional relationship of a plurality of adjacent roadside devices 211. Then, the lane acquisition unit 23 acquires, from the storage unit 26, a plurality of photographed images corresponding to the roadside device ID of the specified roadside device 211.

Furthermore, the lane acquisition unit 23 acquires serial designated numbers corresponding to the vehicle ID of the target vehicle 1K, from the correspondence table stored in the storage unit 26. As one example, the lane acquisition unit 23 acquires "1234" as the serial designated numbers corresponding to the vehicle ID of the target vehicle 1K.

Figure 9:
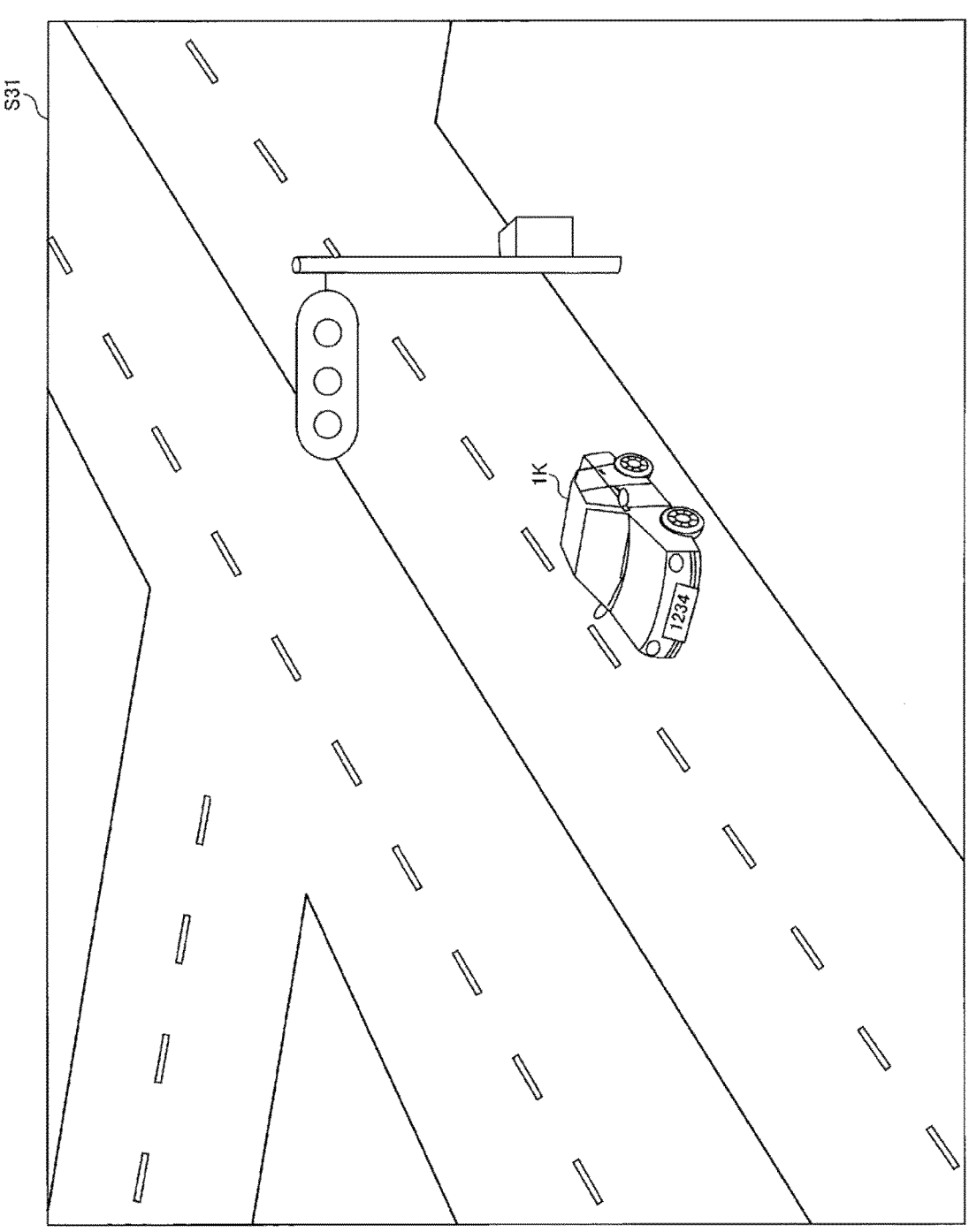
FIG. 9 shows an example of a photographed image extracted by a lane acquisition unit in the traffic system according to the embodiment of the present disclosure.

FIG. 9 shows an example of a photographed image extracted by the lane acquisition unit in the traffic system according to the embodiment of the present disclosure. With reference to FIG. 9, the lane acquisition unit 23 extracts a photographed image S31 including the target vehicle 1K whose license plate has the acquired serial designated numbers, i.e., "1234", from among a plurality of photographed images acquired from the storage unit 26.

The lane acquisition unit 23 analyzes the extracted photographed image S31 to determine the traveling lane DL of the target vehicle 1K and the number-of-lanes LN, based on, for example, the pattern of demarcation lines BL in the photographed image S31. Specifically, in the example shown in FIG. 9, the lane acquisition unit 23 determines that the traveling lane DL is the leftmost lane, and the number-of-lanes LN is "2".

The lane acquisition unit 23 creates lane information indicating the photographing time of the photographed image S31, the traveling lane DL, and the number-of-lanes LN, and stores the created lane information in the storage unit 26.

The creation unit 25 creates traffic information, based on the count value Cnt, and the lane information created by the lane acquisition unit 23.

More specifically, the creation unit 25 determines the traveling lane DL of the target vehicle 1K at one or a plurality of determination times Rt, based on the count value Cnt at the determination time Rt indicated by the relative position information of the target vehicle 1K, with reference to the traveling lane DL at the photographing time indicated by the lane information of the target vehicle 1K. Then, the creation unit 25 calculates the traffic volume of each lane during a predetermined time period, based on the determination result, and creates traffic information based on the calculation result.

Operation Flow

Each of devices in the traffic system according to the embodiment of the present disclosure includes a computer including a memory. An arithmetic processing unit such as a CPU in the computer reads out programs including a part or the entirety of steps in the flow chart and the sequence below from the memory, and executes the programs. Programs for the devices can be respectively installed from outside. The programs for the devices are respectively distributed in a state of being stored in a storage medium, or via a communication network.

Figure 10:
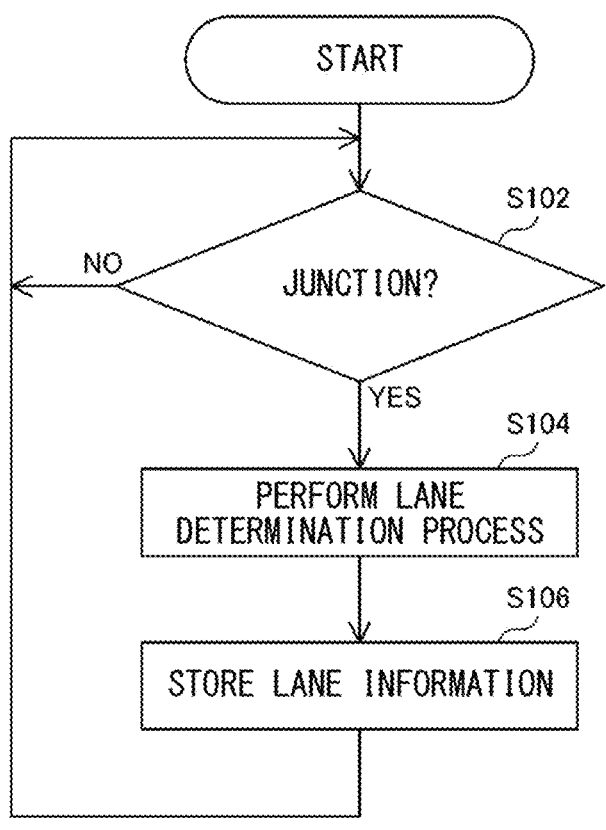
FIG. 10 is a flowchart describing an example of an operation procedure when the in-vehicle device performs the lane determination process, according to the embodiment of the present disclosure.

FIG. 10 is a flowchart describing an example of an operation procedure when the in-vehicle device performs the lane determination process, according to the embodiment of the present disclosure.

With reference to FIG. 10, first, the in-vehicle device 101 waits for detection of a junction, with another road, in the road on which the vehicle 1 travels (NO in step S102). When detecting a junction (YES in step S102), the in-vehicle device 101 performs the lane determination process (step S104).

Next, the in-vehicle device 101 generates lane information indicating the lane determination time Jt, the traveling lane DL, and the number-of-lanes LN, and stores the lane information in the storage unit 16 (step S106).

Next, the in-vehicle device 101 waits for detection of a new junction in the road on which the vehicle 1 travels (NO in step S102).

Figure 11:
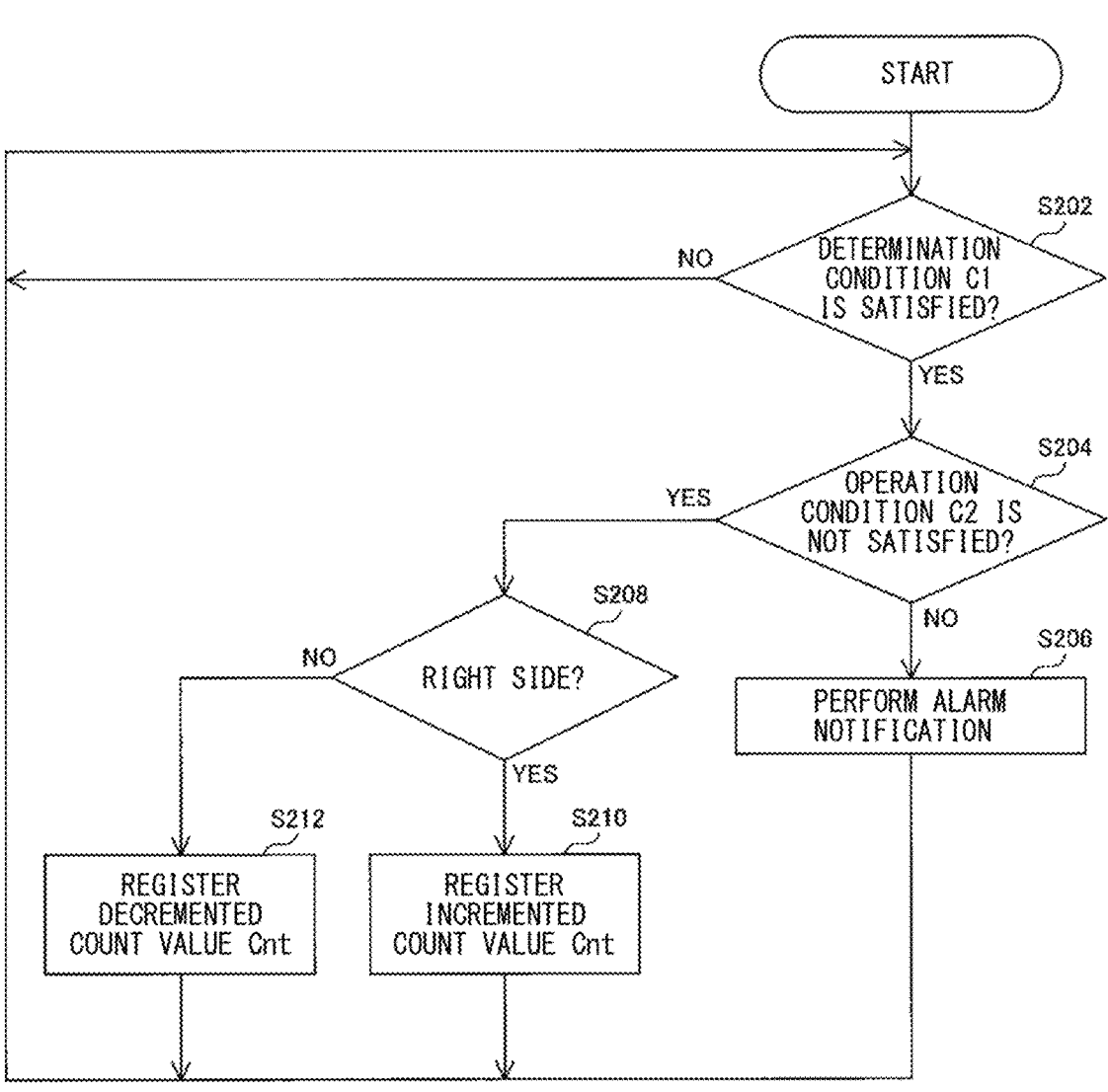
FIG. 11 is a flowchart describing an example of an operation procedure when the in-vehicle device counts a determination result, according to the embodiment of the present disclosure.

FIG. 11 is a flowchart describing an example of an operation procedure when the in-vehicle device counts the determination result, according to the embodiment of the present disclosure.

With reference to FIG. 11, first, the in-vehicle device 101 waits for the positional relationship between the vehicle 1 and the traveling lane DL to satisfy the determination condition C1 (NO in step S202). When the positional relationship between the vehicle 1 and the traveling lane DL satisfies the determination condition C1 and a drive operation performed on the vehicle 1 by the driver does not satisfy the operation condition C2 (YES in step S202 and NO in step S204), the in-vehicle device 101 determines that the vehicle 1 deviates from the lane, and performs an alarm notification (step S206).

Next, the in-vehicle device 101 waits for the positional relationship between the vehicle 1 and the traveling lane DL to newly satisfy the determination condition C1 (NO in step S202).

Meanwhile, when the positional relationship between the vehicle 1 and the traveling lane DL satisfies the determination condition C1R as the determination condition C1 and the drive operation performed on the vehicle 1 by the driver satisfies the operation condition C2 (YES in step S202, YES in step S204, and YES in step S208), the in-vehicle device 101 determines that the vehicle 1 does not deviate from the lane. Then, the in-vehicle device 101 counts the determination result R1R indicating that the positional relationship between the vehicle 1 and the traveling lane DL satisfies the determination condition C1R and the vehicle 1 does not deviate from the lane. More specifically, the in-vehicle device 101 registers a new count value Cnt, which is obtained by incrementing the latest count value Cnt in the storage unit 16, in association with the determination time Rt (step S210).

Next, the in-vehicle device 101 waits for the positional relationship between the vehicle 1 and the traveling lane DL to newly satisfy the determination condition C1 (NO in step S202).

Meanwhile, when the positional relationship between the vehicle 1 and the traveling lane DL satisfies the determination condition C1L as the determination condition C1 and the drive operation satisfies the operation condition C2 (YES in step S202, YES in step S204, and NO in step S208), the in-vehicle device 101 determines that the vehicle 1 does not deviate from the lane. Then, the in-vehicle device 101 counts the determination result R1L indicating that the positional relationship between the vehicle 1 and the traveling lane DL satisfies the determination condition C1L and the vehicle 1 does not deviate from the lane. More specifically, the in-vehicle device 101 registers a new count value Cnt, which is obtained by decrementing the latest count value Cnt in the storage unit 16, in association with the determination time Rt (step S212).

Next, the in-vehicle device 101 waits for the positional relationship between the vehicle 1 and the traveling lane DL to newly satisfy the determination condition C1 (NO in step S202).

Figure 12:
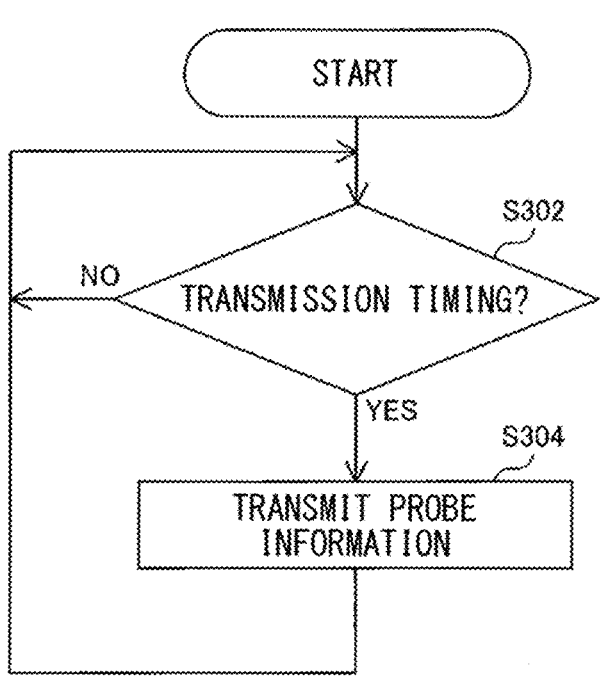
FIG. 12 is a flowchart describing an example of an operation procedure when the in-vehicle device transmits probe information, according to the embodiment of the present disclosure.

FIG. 12 is a flowchart describing an example of an operation procedure when the in-vehicle device transmits probe information, according to the embodiment of the present disclosure.

With reference to FIG. 12, first, the in-vehicle device 101 waits for a transmission timing that follows the transmission cycle Cy (NO in step S302). When the transmission timing has arrived (YES in step S302), the in-vehicle device 101 transmits the probe information. More specifically, the in-vehicle device 101 transmits the probe information including the relative position information and the lane information, to the traffic information creating device 201 (step S304).

Figure 13:
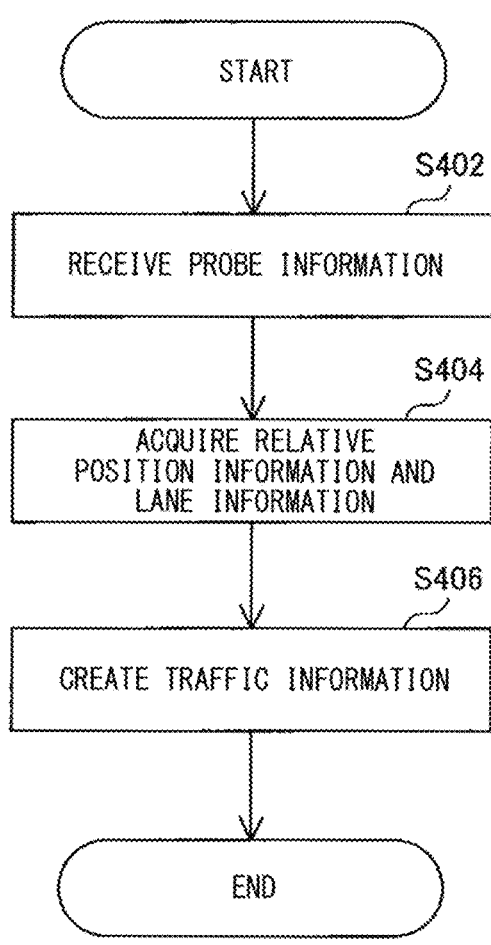
FIG. 13 is a flowchart describing an example of an operation procedure when a traffic information creating device creates traffic information, according to the embodiment of the present disclosure.

FIG. 13 is a flowchart describing an example of an operation procedure when the traffic information creating device creates traffic information, according to the embodiment of the present disclosure.

With reference to FIG. 13, first, the traffic information creating device 201 receives the probe information from the in-vehicle device 101 (step S402).

Next, the traffic information creating device 201 acquires the relative position information and the lane information from the received probe information (step S404).

Next, the traffic information creating device 201 creates traffic information, based on the acquired relative position information and lane information (step S406).

Figure 14:
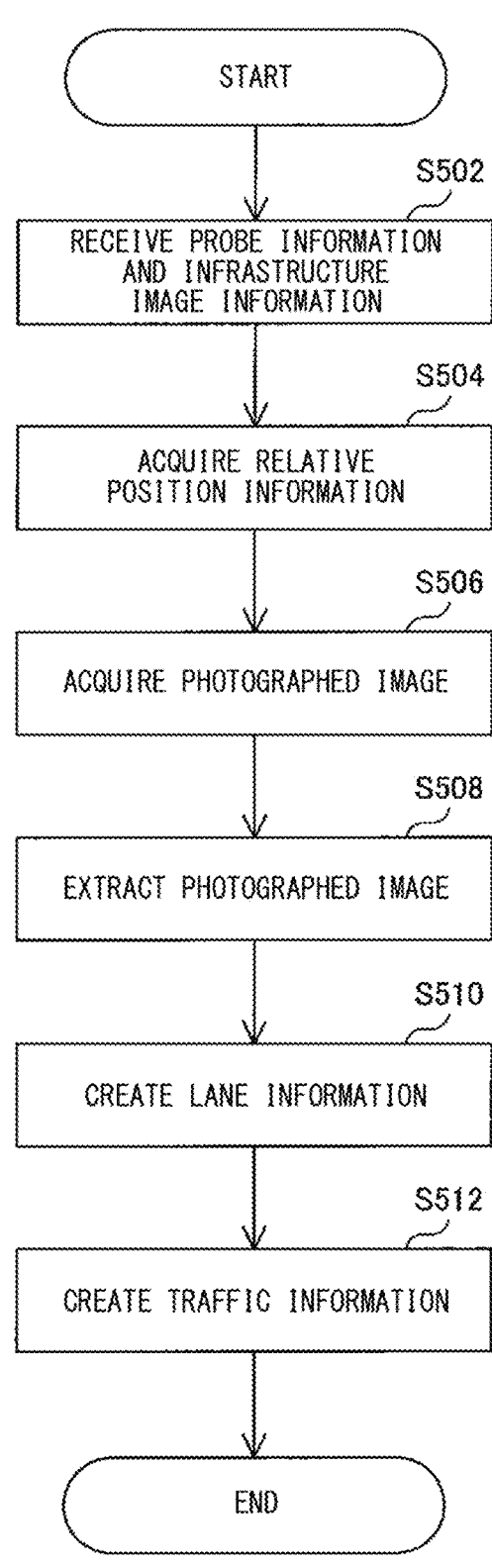
FIG. 14 is a flowchart describing another example of an operation procedure when the traffic information creating device creates traffic information, according to the embodiment of the present disclosure.

FIG. 14 is a flowchart describing another example of the operation procedure when the traffic information creating device creates the traffic information, according to the embodiment of the present disclosure.

With reference to FIG. 14, first, the traffic information creating device 201 receives the probe information from the in-vehicle device 101, and receives the infrastructure image information from the roadside device 211 (step S502).

Next, the traffic information creating device 201 acquires the relative position information from the received probe information (step S504).

Next, the traffic information creating device 201 acquires the photographed image from the received infrastructure image information (step S506).

Next, the traffic information creating device 201 acquires the serial designated numbers corresponding to the vehicle ID of the target vehicle 1K, from the correspondence table stored in the storage unit 26, and extracts, from among a plurality of acquired photographed images, the photographed image S31 including the target vehicle 1K whose license plate has the acquired serial designated numbers (step S508).

Next, the traffic information creating device 201 analyzes the extracted photographed image S31 to determine the lane on which the target vehicle 1K travels, and creates lane information (step S510).

Next, the traffic information creating device 201 creates traffic information, based on the acquired relative position information and the created lane information (step S512).

In the in-vehicle device 101 according to the embodiment of the present disclosure, the notification unit 15 is configured to create the probe information including the relative position information, and transmit the created probe information to the traffic information creating device 201, but is not limited thereto. The notification unit 15 may transmit the relative position information to the traffic information creating device 201 separately from the probe information.

The in-vehicle device 101 according to the embodiment of the present disclosure is configured to include the lane determination unit 13, but the in-vehicle device 101 may not necessarily include the lane determination unit 13.

The traffic information creating device 201 according to the embodiment of the present disclosure is configured to include the image acquisition unit 24, but the traffic information creating device 201 may not necessarily include the image acquisition unit 24.

The embodiment disclosed above is merely illustrative in all aspects and should not be recognized as being restrictive. The scope of the present invention is defined by the scope of the claims rather than the meaning described above, and is intended to include meaning equivalent to the scope of the claims and all modifications within the scope.

The above description includes the features in the additional note below.

Additional Note 1

An in-vehicle device installed in a vehicle, comprising:

a first determination unit configured to determine whether or not the vehicle has crossed or may possibly cross a right-side boundary of a traveling lane that is a lane on which the vehicle is traveling, based on a captured image that shows a road around the vehicle;

a second determination unit configured to determine whether or not the vehicle has crossed or may possibly cross a left-side boundary of the traveling lane, based on the captured image that shows the road around the vehicle;

an operation determination unit configured to determine whether or not a drive operation performed on the vehicle by a driver satisfies a predetermined condition, when the first determination unit or the second determination unit has determined that the vehicle has crossed or may possibly cross the boundary of the traveling lane;

a deviation determination unit configured to determine that the vehicle does not deviate from the traveling lane, when the operation determination unit has determined that the drive operation satisfies the predetermined condition;

a count unit configured to count the number of times the first determination unit has determined that the vehicle has crossed or may possibly cross the right-side boundary of the traveling lane and the deviation determination unit has determined that the vehicle does not deviate from the traveling lane, and the number of times the second determination unit has determined that the vehicle has crossed or may possibly cross the left-side boundary of the traveling lane and the deviation determination unit has determined that the vehicle does not deviate from the traveling lane;

a notification unit configured to notify a processing device outside the vehicle of a count value of the count unit; and a lane determination unit configured to, when detecting a junction, with another road, in a road on which the vehicle travels, determine a lane on which the vehicle travels and the number of lanes of the road on which the vehicle travels, wherein the notification unit further notifies the processing device of a determination result by the lane determination unit.

REFERENCE SIGNS LIST 1 vehicle
1K target vehicle
11 determination unit
12 count unit
13 lane determination unit
14 position information acquisition unit
15 notification unit
16 storage unit
21 reception unit
22 count acquisition unit 23 lane acquisition unit
24 image acquisition unit
25 creation unit
26 storage unit
101 in-vehicle device
111 camera
121 GPS receiver
151 intersection
161 junction
201 traffic information creating device
211 roadside device
301 traffic system
L1, L2, 13 lane
BL demarcation line
BL1 roadway outer line
BL2, BL3 lane boundary line
BL4 roadway center line
S21, S32, S31 photographed image

The invention claimed is:

1. An in-vehicle device installed in a vehicle, comprising:
a first determination unit configured to determine whether or not the vehicle has crossed or may possibly cross a right-side boundary of a traveling lane that is a lane on which the vehicle is traveling, based on a captured image that shows a road around the vehicle;
a second determination unit configured to determine whether or not the vehicle has crossed or may possibly cross a left-side boundary of the traveling lane, based on the captured image that shows the road around the vehicle;
an operation determination unit configured to determine whether or not a drive operation performed on the vehicle by a driver satisfies a predetermined condition, when the first determination unit or the second determination unit has determined that the vehicle has crossed or may possibly cross the boundary of the traveling lane;
a deviation determination unit configured to determine that the vehicle does not deviate from the traveling lane, when the operation determination unit has determined that the drive operation satisfies the predetermined condition;
a count unit configured to count
the number of times the first determination unit has determined that the vehicle has crossed or may possibly cross the right-side boundary of the traveling lane and the deviation determination unit has determined that the vehicle does not deviate from the traveling lane, and
the number of times the second determination unit has determined that the vehicle has crossed or may possibly cross the left-side boundary of the traveling lane and the deviation determination unit has determined that the vehicle does not deviate from the traveling lane; and
a notification unit configured to notify a processing device outside the vehicle of a count value of the count unit.

2. The in-vehicle device according to claim 1, wherein
in order to determine whether or not the drive operation satisfies the predetermined condition, the operation determination unit determines whether or not at least one of conditions as follows is satisfied: an abrupt steering wheel operation performed by the driver; an abrupt braking operation performed by the driver; an abrupt accelerating operation performed by the driver; and an operation of a direction indicator performed by the driver.

3. The in-vehicle device according to claim 2, wherein
the notification unit further notifies the processing device of probe information indicating a detection result of a position of the vehicle and a detection time of the position.

4. The in-vehicle device according to claim 2, further comprising a lane determination unit configured to, when detecting a junction, with another road, in a road on which the vehicle travels, determine a lane on which the vehicle travels, wherein
the notification unit further notifies the processing device of a determination result by the lane determination unit.

5. The in-vehicle device according to claim 2, further comprising a lane determination unit configured to determine a lane on which the vehicle travels, and store a determination result in a storage unit, wherein
when detecting a change in the number of lanes at a junction, with another road, in a road on which the vehicle travels, the lane determination unit deletes a past determination result stored in the storage unit, determines the lane on which the vehicle travels, and stores the determination result in the storage unit,
the count unit resets the count value when the lane determination unit has detected a change in the number of lanes, and
the notification unit further notifies the processing device of the determination result by the lane determination unit.

6. The in-vehicle device according to claim 3, further comprising a lane determination unit configured to, when detecting a junction, with another road, in a road on which the vehicle travels, determine a lane on which the vehicle travels, wherein
the notification unit further notifies the processing device of a determination result by the lane determination unit.

7. The in-vehicle device according to claim 3, further comprising a lane determination unit configured to determine a lane on which the vehicle travels, and store a determination result in a storage unit, wherein
when detecting a change in the number of lanes at a junction, with another road, in a road on which the vehicle travels, the lane determination unit deletes a past determination result stored in the storage unit, determines the lane on which the vehicle travels, and stores the determination result in the storage unit,
the count unit resets the count value when the lane determination unit has detected a change in the number of lanes, and
the notification unit further notifies the processing device of the determination result by the lane determination unit.

8. The in-vehicle device according to claim 1, wherein
the notification unit further notifies the processing device of probe information indicating a detection result of a position of the vehicle and a detection time of the position.

9. The in-vehicle device according to claim 8, further comprising a lane determination unit configured to, when detecting a junction, with another road, in a road on which the vehicle travels, determine a lane on which the vehicle travels, wherein
the notification unit further notifies the processing device of a determination result by the lane determination unit.

10. The in-vehicle device according to claim 8, further comprising a lane determination unit configured to determine a lane on which the vehicle travels, and store a determination result in a storage unit, wherein when detecting a change in the number of lanes at a junction, with another road, in a road on which the vehicle travels, the lane determination unit deletes a past determination result stored in the storage unit, determines the lane on which the vehicle travels, and stores the determination result in the storage unit, the count unit resets the count value when the lane determination unit has detected a change in the number of lanes, and the notification unit further notifies the processing device of the determination result by the lane determination unit.

11. The in-vehicle device according to claim 1, further comprising a lane determination unit configured to, when detecting a junction, with another road, in a road on which the vehicle travels, determine a lane on which the vehicle travels, wherein the notification unit further notifies the processing device of a determination result by the lane determination unit.

12. The in-vehicle device according to claim 11, wherein the lane determination unit determines the lane on which the vehicle travels, based on an image captured by an imaging unit installed in the vehicle.

13. The in-vehicle device according to claim 11, wherein the lane determination unit determines the lane on which the vehicle travels, based on a current position of the vehicle and map information.

14. The in-vehicle device according to claim 11, wherein each time the vehicle enters an intersection, the lane determination unit determines the lane on which the vehicle travels, based on an image captured by an imaging unit installed in the vehicle.

15. The in-vehicle device according to claim 1, further comprising a lane determination unit configured to determine a lane on which the vehicle travels, and store a determination result in a storage unit, wherein when detecting a change in the number of lanes at a junction, with another road, in a road on which the vehicle travels, the lane determination unit deletes a past determination result stored in the storage unit, determines the lane on which the vehicle travels, and stores the determination result in the storage unit, the count unit resets the count value when the lane determination unit has detected a change in the number of lanes, and the notification unit further notifies the processing device of the determination result by the lane determination unit.

16. The in-vehicle device according to claim 15, wherein the lane determination unit determines the lane on which the vehicle travels, based on an image captured by an imaging unit installed in the vehicle.

17. A traffic information creating device comprising:

a count acquisition unit configured to acquire, from a target vehicle, a count value based on at least one of the number of times a determination unit, which is configured to determine whether or not the target vehicle deviates from a traveling lane that is a lane on which the target vehicle is traveling, has determined, based on a captured image showing a road around the target vehicle, that the target vehicle has crossed or may possibly cross a right-side boundary of the traveling lane, and has determined that the target vehicle does not deviate from the traveling lane because a drive operation performed on the target vehicle by a driver satisfies a predetermined condition, and the number of times the determination unit has determined, based on the captured image showing the road around the target vehicle, that the target vehicle has crossed or may possibly cross a left-side boundary of the traveling lane, and has determined that the target vehicle does not deviate from the traveling lane because the drive operation satisfies the predetermined condition;

a lane acquisition unit configured to acquire lane information indicating a lane on which the target vehicle travels; and a creation unit configured to create traffic information including information about a lane on which the target vehicle has traveled, based on the count value acquired by the count acquisition unit and the lane information acquired by the lane acquisition unit.

18. The traffic information creating device according to claim 17, wherein the count acquisition unit further acquires identification information of the target vehicle, the traffic information creating device further includes an image acquisition unit configured to acquire an image of a vehicle captured by a roadside device, the lane acquisition unit creates the lane information, based on the image acquired by the image acquisition unit and the identification information acquired by the count acquisition unit, and the creation unit creates the traffic information, based on the count value and the lane information created by the lane acquisition unit.

19. A non-transitory computer-readable storage medium having, stored therein, a notifying program used in an in-vehicle device installed in a vehicle, the program causing a computer to function as:

a first determination unit configured to determine whether or not the vehicle has crossed or may possibly cross a right-side boundary of a traveling lane that is a lane on which the vehicle is traveling, based on a captured image that shows a road around the vehicle;

a second determination unit configured to determine whether or not the vehicle has crossed or may possibly cross a left-side boundary of the traveling lane, based on the captured image that shows the road around the vehicle;

an operation determination unit configured to determine whether or not a drive operation performed on the vehicle by a driver satisfies a predetermined condition, when the first determination unit or the second determination unit has determined that the vehicle has crossed or may possibly cross the boundary of the traveling lane;

a deviation determination unit configured to determine that the vehicle does not deviate from the traveling lane, when the operation determination unit has determined that the drive operation satisfies the predetermined condition;

a count unit configured to count the number of times the first determination unit has determined that the vehicle has crossed or may possibly cross the right-side boundary of the traveling lane and the deviation determination unit has determined that the vehicle does not deviate from the traveling lane, and the number of times the second determination unit has determined that the vehicle has crossed or may possibly cross the left-side boundary of the traveling lane and the deviation determination unit has determined that the vehicle does not deviate from the traveling lane; and a notification unit configured to notify a processing device outside the vehicle of a count value of the count unit.

20. A non-transitory computer-readable storage medium having, stored therein, a traffic information creating program used in a traffic information creating device, the program causing a computer to function as:

a count acquisition unit configured to acquire, from a target vehicle, a count value based on at least one of the number of times a determination unit, which is configured to determine whether or not the target vehicle deviates from a traveling lane that is a lane on which the target vehicle is traveling, has determined, based on a captured image showing a road around the target vehicle, that the target vehicle has crossed or may possibly cross a right-side boundary of the traveling lane, and has determined that the target vehicle does not deviate from the traveling lane because a drive operation performed on the target vehicle by a driver satisfies a predetermined condition, and the number of times the determination unit has determined, based on the captured image showing the road around the target vehicle, that the target vehicle has crossed or may possibly cross a left-side boundary of the traveling lane, and has determined that the target vehicle does not deviate from the traveling lane because the drive operation satisfies the predetermined condition;

a lane acquisition unit configured to acquire lane information indicating a lane on which the target vehicle travels; and a creation unit configured to create traffic information including information about a lane on which the target vehicle has traveled, based on the count value acquired by the count acquisition unit and the lane information acquired by the lane acquisition unit.

\* \* \* \* \*